(12) United States Patent
Kimura et al.

(10) Patent No.: US 9,090,346 B2
(45) Date of Patent: Jul. 28, 2015

(54) WING STRUCTURE AND FAIRING DEVICE

(75) Inventors: Yukihide Kimura, Gotenba (JP);
Tomoaki Morimoto, Gotenba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 70 days.

(21) Appl. No.: 13/499,970

(22) PCT Filed: Oct. 7, 2010

(86) PCT No.: PCT/JP2010/067668
§ 371 (c)(1),
(2), (4) Date: Apr. 3, 2012

(87) PCT Pub. No.: WO2011/043431
PCT Pub. Date: Apr. 14, 2011

(65) Prior Publication Data
US 2012/0207609 A1 Aug. 16, 2012

(30) Foreign Application Priority Data
Oct. 7, 2009 (JP) ................................. 2009-233411

(51) Int. Cl.
*B64C 39/12* (2006.01)
*B64C 39/08* (2006.01)
(Continued)

(52) U.S. Cl.
CPC ................ *B64C 39/08* (2013.01); *B62D 35/00* (2013.01); *B64C 23/00* (2013.01)

(58) Field of Classification Search
CPC ........ B64C 30/00; B64C 23/04; Y02T 10/00; Y02T 50/32
USPC ............................. 244/35 R, 35 A, 198, 45 R
See application file for complete search history.

(56) References Cited

U.S. PATENT DOCUMENTS 1,974,407 A * 9/1934 Barnhart ........................ 244/217
2,317,267 A * 4/1943 Gazda ........................... 244/218
(Continued)

FOREIGN PATENT DOCUMENTS

EP        0 891 925 A1     1/1999
FR          727730 A       6/1932
(Continued)

OTHER PUBLICATIONS

May 18, 2012 Translation of International Preliminary Report on Patentability issued in International Patent Application No. PCT/JP2010/067668.

(Continued)

*Primary Examiner* — Brian M O'Hara
*Assistant Examiner* — Keith L Dixon
(74) *Attorney, Agent, or Firm* — Oliff PLC

(57) ABSTRACT

A wing structure includes: a main wing that extends in a second direction intersecting a first direction as a fluid flow direction; and an auxiliary wing that is disposed so as to be separated from the main wing and faces the main wing at the front part side of the main wing, wherein a wing chord length of the auxiliary wing is shorter than a wing chord length of the main wing. A fluid contacts the auxiliary wing which is formed at the front part side of the main wing, the fluid is guided between the auxiliary wing and the main wing, and the fluid is compressed when passing between the auxiliary wing and the main wing, thereby appropriately forming a fluid compression process region on the surface of the main wing and increasing an acting force.

9 Claims, 49 Drawing Sheets

(51) Int. Cl.
*B62D 35/00* (2006.01)
*B64C 23/00* (2006.01)

(56) References Cited

U.S. PATENT DOCUMENTS

| | | | |
|---|---|---|---|
| 3,776,491 A | | 12/1973 | Oulton |
| 4,003,533 A | * | 1/1977 | Carter et al. .................. 244/217 |
| 4,007,896 A | * | 2/1977 | Reynolds, III ................ 244/215 |
| 4,966,338 A | | 10/1990 | Gordon |
| 6,079,672 A | * | 6/2000 | Lam et al. ..................... 244/217 |
| 6,513,754 B1 | * | 2/2003 | Grove .......................... 244/35 A |
| 8,123,160 B2 | * | 2/2012 | Shepshelovich et al. ... 244/45 R |
| 2013/0119703 A1 | | 5/2013 | Fujii et al. |

FOREIGN PATENT DOCUMENTS

| | | |
|---|---|---|
| GB | 317841 A | 6/1930 |
| GB | 2107426 A | 4/1983 |
| JP | A-63-180575 | 7/1988 |
| JP | A-01-101296 | 4/1989 |
| JP | A-03-060180 | 3/1991 |
| JP | A-07-010088 | 1/1995 |
| JP | A-09-109811 | 4/1997 |
| JP | A-2002-137789 | 5/2002 |
| JP | A-2006-143140 | 6/2006 |
| JP | A-2006-160233 | 6/2006 |
| JP | A-2009-029400 | 2/2009 |
| JP | A-2009-074447 | 4/2009 |
| JP | A-2009-090681 | 4/2009 |

OTHER PUBLICATIONS

International Preliminary Report on Patentability issued in Application No. PCT/JP2010/067668; Dated Dec. 13, 2011 (With Partial Translation).
International Search Report issued in Application No. PCT/JP2010/067668; Dated Nov. 16, 2010 (With Translation).
Feb. 23, 2015 Search Report issued in European Application No. 10822101.1.

* cited by examiner

WING STRUCTURE AND FAIRING DEVICE

TECHNICAL FIELD

The present invention relates to a wing structure and a fairing device.

BACKGROUND ART

Hitherto, there have been flying objects that employ wing structure technology that makes use of the Coanda effect for increasing lift force (for example, see Patent Literature 1). A moving object described in Patent Literature 1 includes: a fluid supply portion which supplies fluid; a lift force generating portion which has an outer surface inclined downward with respect to the fluid flow direction, and obtains a lift force by changing the fluid flow direction downward; and a fluid collecting portion which has an opposite surface facing the outer surface of the lift force generating portion and in which a gap between the outer surface and the opposite surface on the upstream side of the fluid flow direction is wider than the gap between the outer surface and the opposite surface on the downstream side. In such a moving object, degradation in the flow speed caused by fluid loss is prevented, and the lift force is improved.

CITATION LIST

Patent Literature

[Patent Literature 1] Japanese Unexamined Patent Application Publication No. 2009-29400

SUMMARY OF INVENTION

Technical Problem

FIG. 2 is a side view illustrating an existing wing, and is a diagram illustrating the flow of a fluid around the wing. As shown in FIG. 2, on the upper surface of the existing wing 101, a expansion flow region B is formed after a contraction flow region A is formed in the fluid flow direction X. However, the peripheral fluid may escape without sufficiently flowing into the contraction flow portion of the wing. As a result, a sufficient acting force may not be obtained.

It is an object of the invention a wing structure and a fairing device capable of efficiently compressing a fluid and increasing an acting force.

Solution to Problem

The inventor found that a fluid may be efficiently compressed and an acting force may be increased by installing an auxiliary wing on a main wing and optimizing the shape or the arrangement of the auxiliary wing while repeatedly performing a careful examination for the purpose of solving the above-described problem. That is, the invention is contrived from the knowledge that a fluid compression process region may be formed in the front part of the main wing by using the auxiliary wing and an acting force may be increased by converting the internal energy of the fluid into kinetic energy or mechanical energy by the adiabatic expansion after compression.

A wing structure of the invention includes: a main wing that extends in a second direction intersecting a first direction as a fluid flow direction; and an auxiliary wing that is disposed so as to be separated from the main wing and faces the main wing at the front part side of the main wing, wherein a wing chord length of the auxiliary wing is shorter than a wing chord length of the main wing.

The wing structure according to the invention includes the auxiliary wing which faces the main wing at the front part side of the main wing, and the wing chord length of the auxiliary wing is set to be shorter than the wing chord length of the main wing. In such a wing structure, a fluid contacts the auxiliary wing formed at the front part side of the main wing, the fluid is guided between the auxiliary wing and the main wing, and the fluid is compressed while passing between the auxiliary wing and the main wing, the fluid compression process region may be appropriately formed on the surface of the main wing. Then, since the internal energy of the fluid is converted into kinetic energy or mechanical energy by the adiabatic expansion after the compression, the acting force may be increased and the lift force may be effectively improved.

Further, a wing structure of the invention includes: a main wing that extends in a second direction intersecting a first direction as a fluid flow direction; and an auxiliary wing that is disposed so as to be separated from the main wing and faces the main wing at the front part side of the main wing, wherein the auxiliary wing includes a first curved surface capable of forming a fluid compression process region in a gap between the auxiliary wing and the main wing, and wherein the main wing includes a second curved surface which is curved to the opposite side of the auxiliary wing. In such a wing structure, a fluid contacts the first curved surface of the auxiliary wing formed at the front part side of the main wing, the fluid is guided between the auxiliary wing and the main wing, and the fluid is compressed when passing between the auxiliary wing and the main wing, thereby appropriately forming the fluid compression process region on the surface of the main wing and increasing the acting force. Further, since the main wing has the second curved surface which is curved to the opposite side of the auxiliary wing, the expansion flow region may be formed after the compression process region.

Here, the curvature of the curved surface of the auxiliary wing facing the main wing may be larger than the curvature of the curved surface of the main wing formed on the side of the auxiliary wing. Accordingly, it is possible to realize a function of further effectively compressing the fluid.

Further, the auxiliary wing may be rotatable about a predetermined shaft extending in the second direction. Accordingly, since the rotation angle of the auxiliary wing is adjusted in accordance with the flow speed of the fluid, the inclination angle of the auxiliary wing with respect to the fluid flow direction may be changed. Since the resistance value increases in the high-speed region, the resistance may be reduced by adjusting the inclination angle of the auxiliary wing.

Further, a fairing device that is provided in a moving object, the fairing device of the invention including: a main wing that protrudes in a second direction intersecting a first direction as the front-rear direction of the moving object; and an auxiliary wing that is disposed so as to be separated from the main wing and faces the main wing at the front part side of the main wing, wherein a wing chord length of the auxiliary wing is shorter than a wing chord length of the main wing.

In the fairing device, a fluid contacts the auxiliary wing formed at the front part side of the main wing, the fluid is guided between the auxiliary wing and the main wing, and the fluid is compressed when passing between the auxiliary wing and the main wing, thereby appropriately forming the fluid compression process region on the surface of the main wing. Accordingly, since the internal energy of the fluid may be converted into kinetic energy or mechanical energy by the adiabatic expansion in the expansion flow region and the flow rate thereof may increase with kinetic momentum given to the peripheral fluid, the acting force of the fairing device increases even at the low flow speed. Furthermore, the fairing device may be decreased in size compared to the related art.

In the fairing device, the auxiliary wing may be provided at both sides of the main wing. Since the auxiliary wing is provided at both sides of the main wing, the fluid compression process region may be appropriately formed on both surfaces of the main wing, the more internal energy of the fluid may be converted into kinetic energy or mechanical energy, and the flow rate may be increased with kinetic momentum given to the more peripheral gas.

The main wing and the auxiliary wing may be provided in a side portion of the moving object, and the main wing may have a shape in which the main wing has a wing thickness in the vertical direction of the moving object. Since the main wing and the auxiliary wing are provided in a side portion of the moving object and the main wing has a shape in which the main wing has a wing thickness in the vertical direction of the moving object, the fluid which flows to the side portion of the moving object may be further taken into the fairing device. Further, the moving object may be more stably moved.

Further, the main wing and the auxiliary wing may be provided at the lower side of the moving object, and the main wing may have a shape in which the main wing has a wing thickness in the width direction of the moving object. Since the main wing and the auxiliary wing are provided at the lower side of the moving object and the main wing has a shape in which the main wing has a wing thickness in the width direction of the moving object, the fluid which flows to the lower side of the moving object may be taken into the fairing device from both sides of the moving object and the acting force may be effectively increased.

The auxiliary wing may have a shape in which the auxiliary wing has a wing thickness in the vertical direction of the moving object, and a portion in which the wing thickness of the auxiliary wing becomes maximal may be set at the front side of a portion in which the wing thickness of the main wing becomes maximal. Since the auxiliary wing has a shape in which the auxiliary wing has a wing thickness in the vertical direction of the moving object and a portion in which the wing thickness of the auxiliary wing becomes maximal is set at the front side of a portion in which the wing thickness of the main wing becomes maximal, the effect of the compression may be improved while sufficiently ensuring the fluid which flows into the expansion flow region.

The auxiliary wing may have a shape in which the auxiliary wing has a wing thickness in the width direction of the moving object, and a portion in which the wing thickness of the auxiliary wing becomes maximal may be set at the front side of a portion in which the wing thickness of the main wing becomes maximal. Since the auxiliary wing has a shape in which the auxiliary wing has a wing thickness in the width direction of the moving object and a portion in which the wing thickness of the auxiliary wing becomes maximal is set at the front side of a portion in which the wing thickness of the main wing becomes maximal, the effect of the compression may be improved while sufficiently ensuring the fluid which flows into the expansion flow region.

The height of the auxiliary wing may be larger than a half of the height of the main wing in a portion in which the wing thickness of the main wing becomes maximal. When the height of the auxiliary wing is smaller than a half of the height of the main wing in a portion where the wing thickness of the main wing becomes maximal, the effect of the compression may be noticeably degrade.

The center of the auxiliary wing in the front-rear direction of the moving object may be set at the front side of a portion in which the wing thickness of the main wing becomes maximal. Since the center of the auxiliary wing in the front-rear direction of the moving object is set at the front side of a portion in which the wing thickness of the main wing becomes maximal, the center is positioned at the front side of the boundary point between the contraction flow region and the expansion flow region, and the effect of the compression may be improved while sufficiently ensuring the fluid which flows into the expansion flow region.

The distance and the angle of the auxiliary wing with respect to the main wing may change depending on the type and the temperature of the fluid. After the compression, the ratio contributing to the volume expansion during the adiabatic expansion and the ratio contributing to an increase in the temperature are dependent on the type of the fluid molecule or the temperature of the system (the start temperature) at that time. Therefore, when the distance and the angle between the auxiliary wing and the main wing are changed depending on the type and the temperature of the fluid, the acting force may be adjusted.

Advantageous Effects of Invention

According to the invention, it is possible to provide a wing structure and a fairing device capable of efficiently compressing a fluid and increasing an acting force.

DESCRIPTION OF EMBODIMENTS

Figure 1:
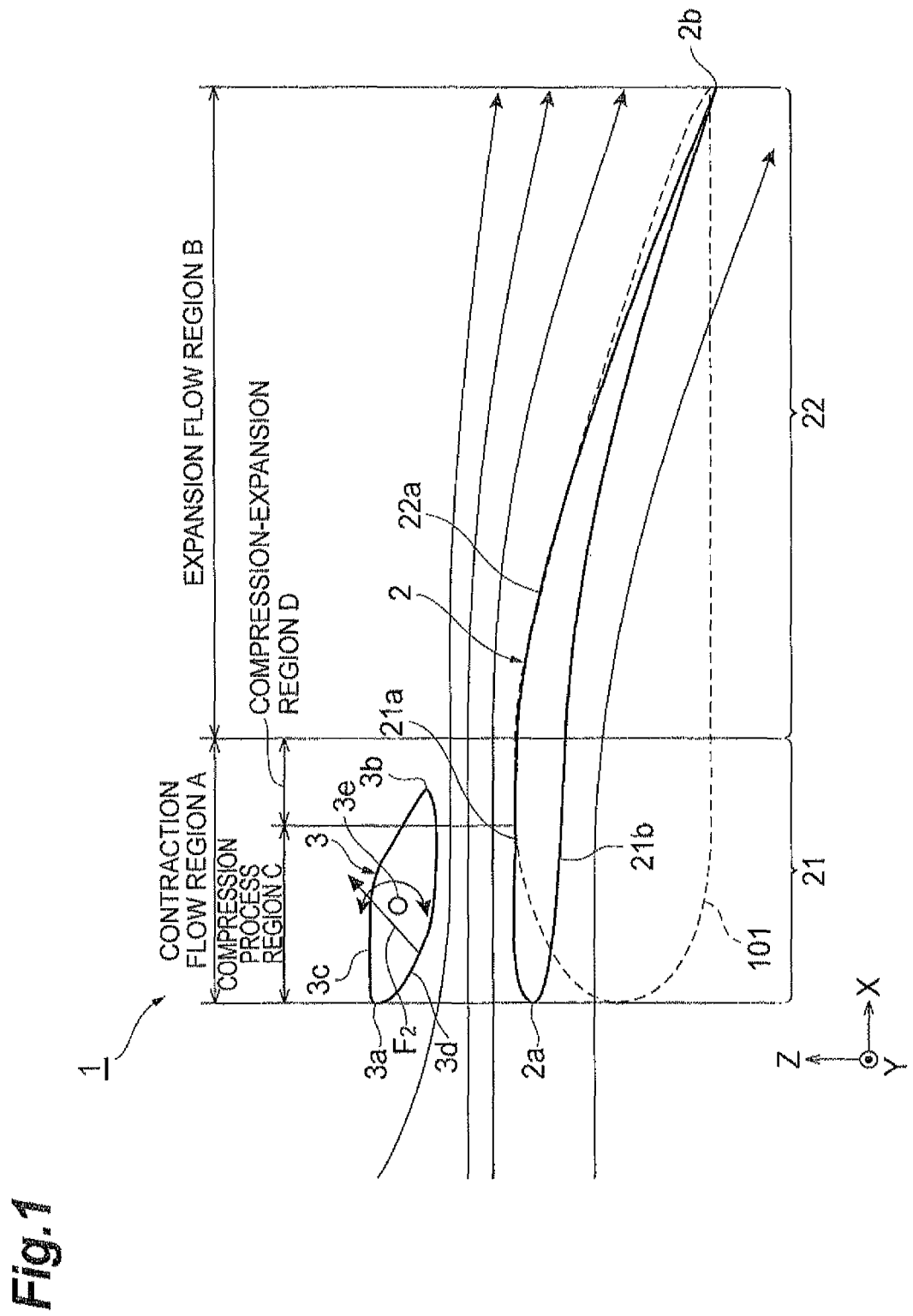
FIG. 1 is a schematic diagram illustrating a wing structure and a flow of a peripheral fluid according to the embodiment of the invention.
Figure 2:
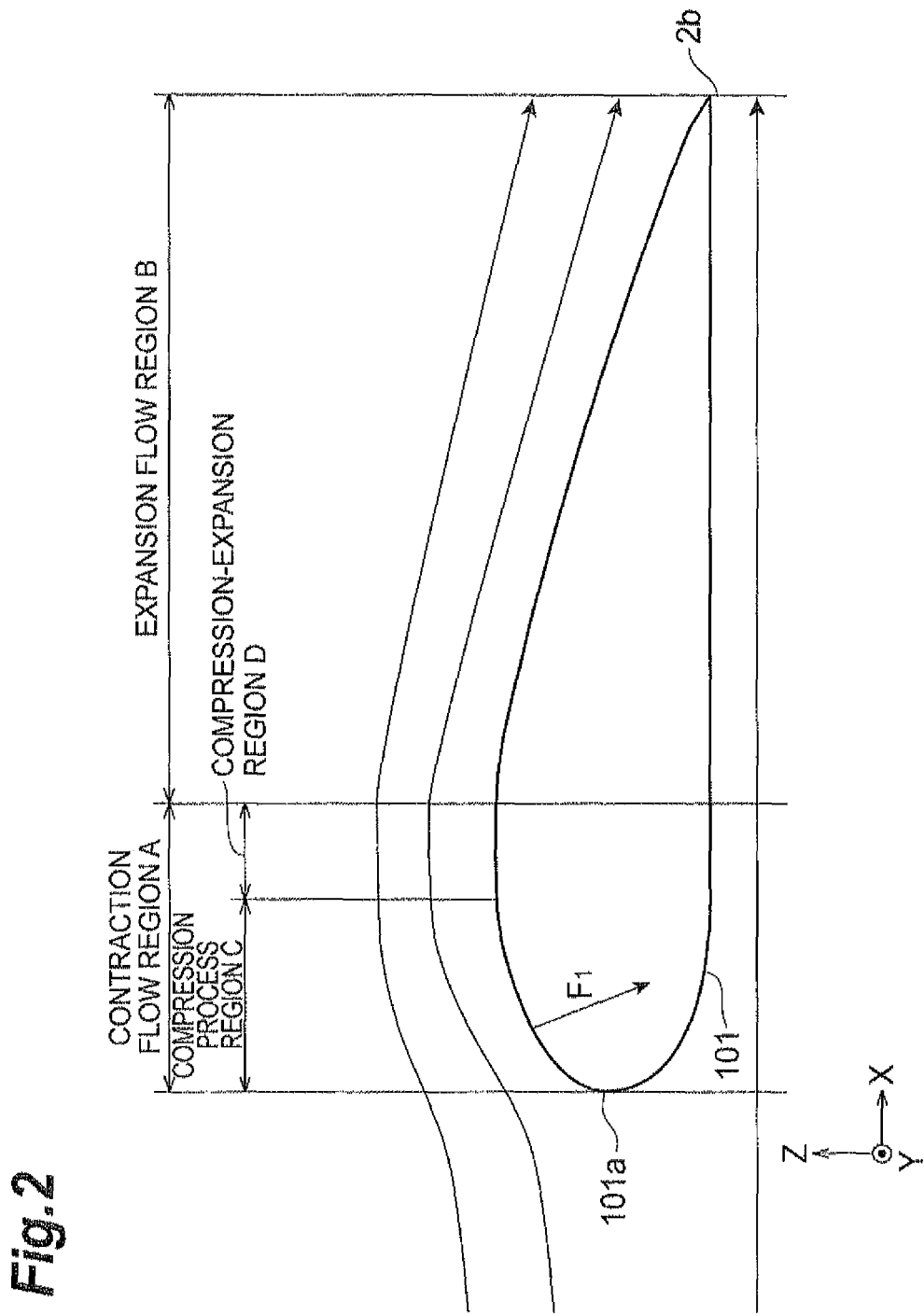
FIG. 2 is a schematic diagram illustrating a wing structure and a flow of a peripheral fluid of the related art.

Hereinafter, an exemplary embodiment of the invention will be described by referring to the drawings. Furthermore, in the description of the drawings, the same reference numerals are given to the same or equivalent components, and the repetitive description will not be repeated. FIG. 1 is a schematic diagram illustrating a wing structure and a flow of a peripheral fluid according to the embodiment of the invention. The fluid is not particularly limited, and may be a gas such as air and a liquid such as water. In the description below, the fluid mainly corresponds to a gas (air). A wing structure 1 includes a main wing 2 which extends in the width direction (second direction) Y of the air frame intersecting the front-rear direction (first direction) X and an auxiliary wing 3 which faces the main wing 2 at the front part side of the main wing 2.

The main wing 2 includes a contraction flow forming portion 21 which corresponds to the front part side and a expansion flow forming portion 22 which is formed so as to be continuous to the rear side of the contraction flow forming portion. The contraction flow forming portion 21 has a substantially constant thickness in the advancing direction, and an upper surface 21a and a lower surface 21b of the contraction flow forming portion 21 form a surface which is substantially parallel to the advancing direction. In the main wing 2, for example, a portion of about ⅓ of the wing chord length is formed as the contraction flow forming portion 21. Further, a large camber is not formed in the main wing 2. The expansion flow forming portion 22 is curved downward as it moves to the rear side. An upper surface 22a of the expansion flow forming portion 22 has a gentle curved surface. The wing thickness of the expansion flow forming portion 22 decreases toward a rear edge 2b.

The auxiliary wing 3 is disposed so as to be separated from the main wing 2 in the vertical direction Z on the front part side of the main wing 2. The width of the auxiliary wing 3 in the front-rear direction X (the length from the front edge 3a to the rear edge 3b) is shorter than the width of the main wing 2 in the front-rear direction (the length from the front edge 2a to the rear edge 2b) and is shorter than the length L of the contraction flow forming portion 21 in the front-rear direction. Further, the front edge 3a of the auxiliary wing 3 and the front edge 2a of the main wing 2 are formed at substantially the same position in the front-rear direction X. Furthermore, the front edge 3a of the auxiliary wing 3 may be formed in front of the front edge 2a of the main wing 2 and may be formed in rear of the front edge. Further, it is effective that the rear edge 3b of the auxiliary wing 3 is formed in front of the expansion flow forming portion 22 of the main wing 2.

Further, the upper surface 3c of the auxiliary wing 3 forms a surface which is substantially parallel to the front-rear direction X on the front part side. Then, the upper surface forms a surface which is curved and inclined downward on the rear side. On the other hand, the lower surface 3b of the auxiliary wing 3 forms a surface which is inclined downward and curved on the front part side, and forms a surface which is substantially parallel to the front-rear direction X on the rear part side. The wing thickness of the auxiliary wing 3 is the largest in the vicinity of the center in the front-rear direction X. For example, the maximal wing thickness of the auxiliary wing 3 may be set about twice the wing thickness of the contraction flow forming portion 21 of the facing main wing 2.

Then, the lower surface 3d of the auxiliary wing 3 serves as a curved surface which forms a contraction flow region A on the upper surface side of the main wing 2. The gap between the upper surface 21a of the contraction flow forming portion 21 of the main wing 2 and the lower surface 3d of the auxiliary wing 3 in the vertical direction Z is narrowed toward the rear side and then is substantially constant. For example, the gap between the front edge 3a of the auxiliary wing 3 and the front edge 2a of the main wing 2 may be about four times the wing thickness of the contraction flow forming portion 21, and the gap between the rear edge 3b of the auxiliary wing 3 and the wing upper surface 21a of the contraction flow forming portion 21 may be about three times the wing thickness of the contraction flow forming portion 21.

Further, with regard to the curved surface of the lower surface 3d of the auxiliary wing 3, the inclined surface which faces the front side is curved so as to form a surface parallel to the front-rear direction X as it moves to the rear side. Further, it is desirable that the curvature of the curved surface of the lower surface 3d of the auxiliary wing 3 is larger than the curvature of the curved surface of the upper surface 22a of the expansion flow forming portion 22.

Further, the auxiliary wing 3 includes a rotary shaft 3e, which extends in the width direction Y of the air frame at the center of the auxiliary wing 3, and is rotatable about the rotary shaft 3e. Further, the auxiliary wing 3 may be supported from the downside and be fixed to the main wing 2. For example, the auxiliary wing may be supported from the width direction Y of the air frame and be fixed to the air frame body. Accordingly, when the rotary angle of the auxiliary wing is adjusted with the flow speed of the fluid, the inclined angle of the auxiliary wing with respect to the fluid flow direction may be changed. Since the resistance value increases at a high-speed region, the resistance may be reduced in a manner such that the inclined angle of the auxiliary wing is adjusted and the auxiliary wing is substantially parallel to the main wing.

The airflow around the wing structure 1 will be described. In the wing structure 1, a contraction flow region A is formed on the side of the upper surface 21a of the contraction flow forming portion 21, and a expansion flow region B is formed on the side of the upper surface 22a of the expansion flow forming portion 22. Further, a compression process region C is formed on the front part side of the contraction flow region A, and a compression-expansion region (contraction→expansion transition portion) D is formed on the rear part side thereof.

In the vicinity of the compression process region C, the internal energy (temperature) of the fluid increases due to the compressing. However, the pressure decreases with an increase in the flow speed (the contraction flow), an expansion in the volume of air is suppressed, and an increase in the temperature of air is suppressed. At this time, air adiabatically expands particularly in the expansion flow region B, so that it works on the outside (peripheral air) and the flow speed (momentum) increases together with the peripheral air. At this time, the working direction is the stream-line direction since the expansion of air of the wing upper surface 22a is generated in the stream-line direction. That is, the flow speed of the wing upper surface 22a of the main wing 2 increases. This may be checked by an experiment or the like.

A decrease in the temperature of air occurs due to the action on the peripheral air by the adiabatic expansion in the expansion flow region B. The decrease in the temperature may be observed by vapor trails (trail) generated at the wing tip due to a quick turn in a wing car or an airplane rolling rapidly. A decrease in the temperature does not occur in a gas which freely expands in a vacuum state, and a decrease in the temperature occurs at the time of work on the outside. Here, the trail of the wing tip of the wing car or the like occurs by the condensation of vapor, and the condensation is dependent on not the pressure but the temperature. Thus, the generation of the white trail in the wing car or the like may be observes as a decrease in the temperature, that is, a result of work on the outside.

Further, it is effective that the position of the rear edge 3b of the auxiliary wing 3 is present up to the front side of the expansion flow region B. Since the pressure of the main flow decreases in the expansion flow region B, the peripheral air attempts to flow thereinto. At this time, a force acts on the main flow so that a speed decreases toward the peripheral air flow due to the law of action and reaction. Here, the internal energy of the main flow is converted into kinetic energy or mechanical energy. Then, the main flow overcomes the force acting thereon so that a speed decreases toward the peripheral air flow due to the converted kinetic energy and mechanical energy.

Here, when the peripheral air flow flows, the pressure of the air flow which (is bent) flows from the periphery decreases (adiabatically expands), and the internal energy is converted into kinetic momentum. Then, due to the kinetic momentum, the peripheral air flow merges with the main flow, and the kinetic momentum of the main flow further increases, so that an acting force increases. In a fluid in which the peripheral air flow and the main flow merge with each other, when the flowing direction changes to the downside due to the Coanda effect in the curved surface (22a) of the main wing 2, a force as the reaction thereof acts on the wing structure 1, and becomes at least a part of a lift force. The peripheral air flow is pulled due to a decrease in the pressure of the main flow, and the main flow receives kinetic momentum from the peripheral air. For this reason, since the expansion flow region B has a function of receiving the peripheral air flow, it is more effective that the rear edge 3b of the auxiliary wing 3 is formed up to the front side of the expansion flow region B so as not to disturb the inflow of the peripheral air flow.

In such a wing structure 1, since the auxiliary wing 3 is disposed so as to face the main wing 2 on the front part side of the main wing 2, the air which collides with the auxiliary wing 3 is pulled between the auxiliary wing 3 and the main wing 2, and is compressed when passing between the auxiliary wing 3 and the main wing 2. Accordingly, the compression process region C may be formed in the contraction flow region A. Further, the curved surface 22a which is curved in the direction opposite to the auxiliary wing 3 is formed on the rear part side of the main wing 2. Accordingly, due to the contraction flow (compression flow) at the front part side and the expansion flow at the rear part side, the compression-adiabatic expansion is promoted, and the kinetic momentum increases. Accordingly, the lift force may be ensured without increasing the camber of the main wing 2, and a decrease in the thickness of the main wing 2 may be realized. For this reason, since the camber of the main wing 2 is not large, there is an effect that a downward force (a negative lift force) is not large at the contraction flow portion due to the main wing 2, the lift force may be improved, and consumption energy in the power source of the air frame may be suppressed.

Further, since the auxiliary wing 3 forms an inclined surface (a curved surface) which is inclined downward at the gas inflow side, air contacts the lower surface 3d of the auxiliary wing 3, so that the auxiliary wing may receive the upward force $F_2$ and improve the lift force.

As described above, in the wing structure according to the embodiment of the invention, a fluid contacts the auxiliary wing formed on the front part side of the main wing, the fluid is guided between the auxiliary wing and the main wing, and the fluid is compressed when passing between the auxiliary wing and the main wing. Accordingly, the fluid compression process region may be appropriately formed on the main wing surface. Accordingly, the internal energy of the fluid may be converted into kinetic energy or mechanical energy due to the adiabatic expansion of the expansion flow region, and the acting force may be improved.

Next, the fairing device of the invention will be described. The fairing device of the invention includes a main wing which is provided in a moving object and protrudes in the second direction intersecting the first direction corresponding to the front-rear direction of the moving object and an auxiliary wing which is disposed so as to be separated from the main wing and faces the main wing on the front part side of the main wing, where the wing chord length of the auxiliary wing is shorter than the wing chord length of the main wing.

Figure 3:
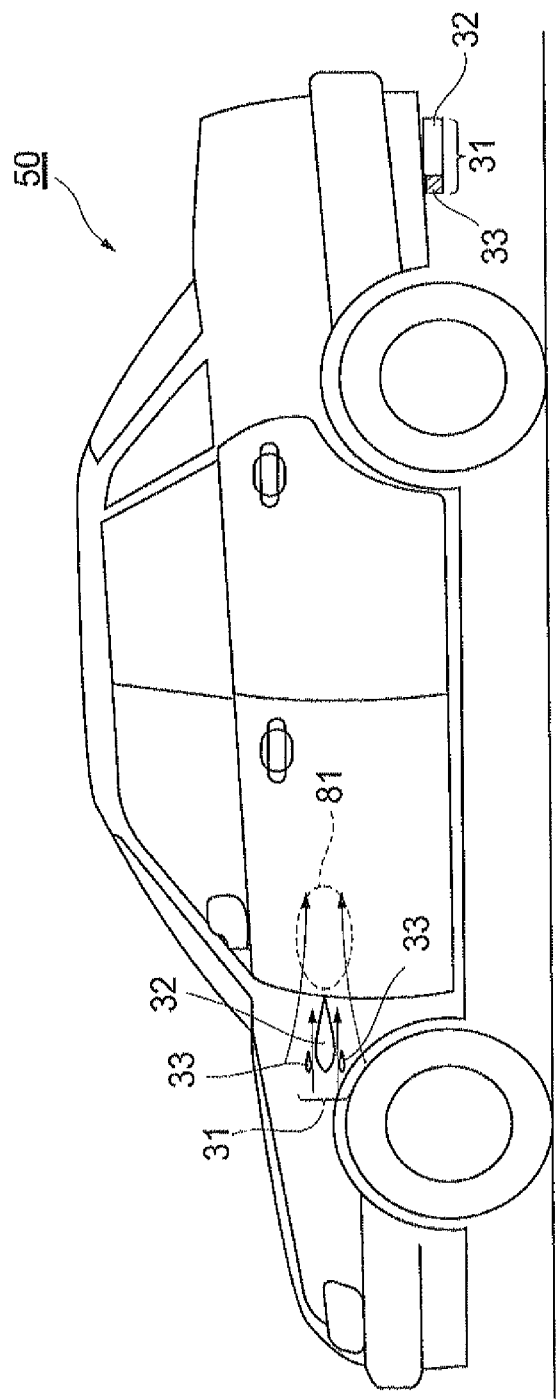
FIG. 3 is a side view illustrating a vehicle equipped with a fairing device according to the embodiment of the invention.
Figure 4:
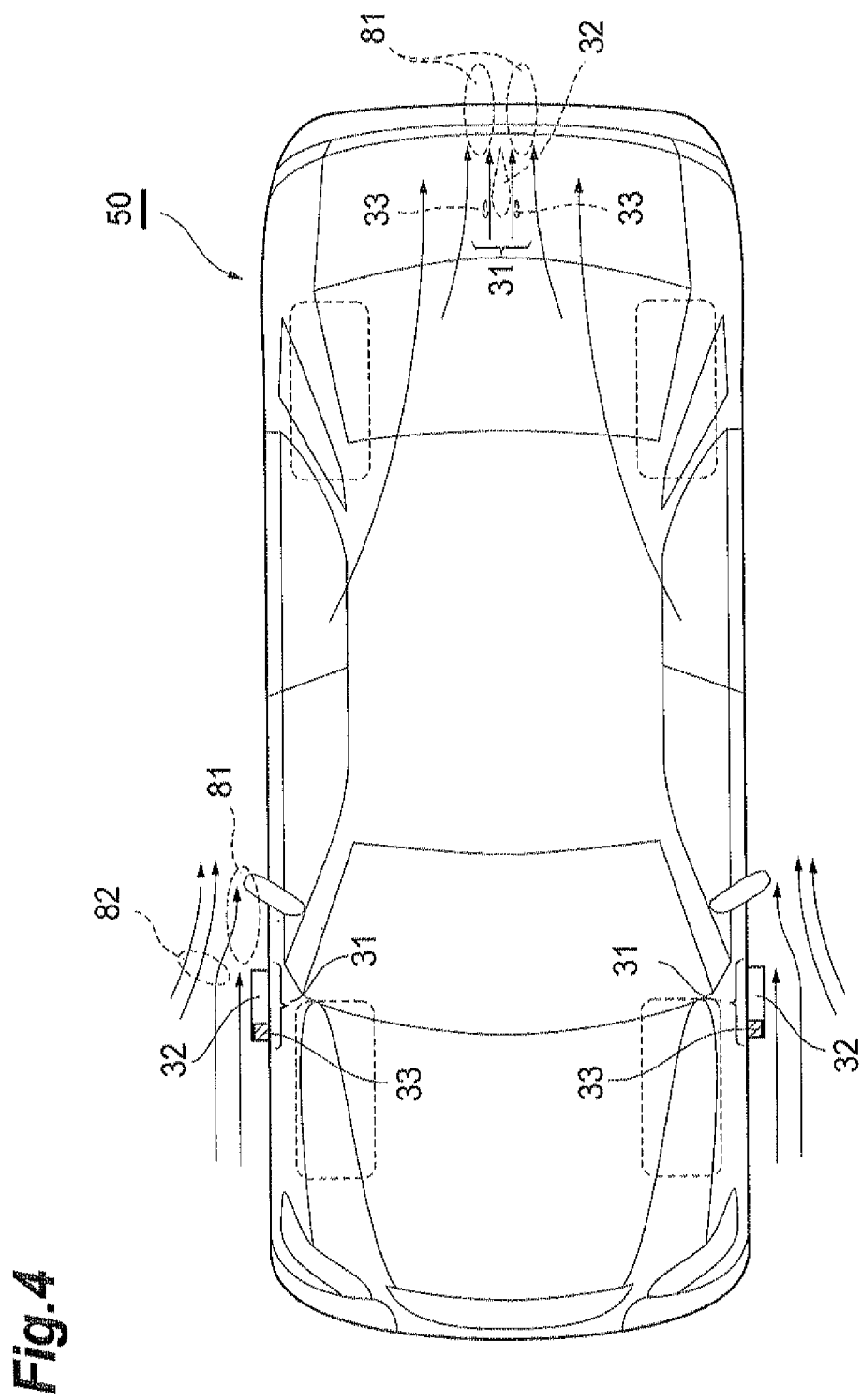
FIG. 4 is a top view illustrating a vehicle equipped with a fairing device according to the embodiment of the invention.

FIG. 3 is a side view illustrating a vehicle equipped with the fairing device according to the embodiment of the invention, and FIG. 4 is a top view illustrating the vehicle. As shown in FIGS. 3 and 4, the front side surface and the rear lower surface of the vehicle 50 are provided with a fairing device 31 which includes a main wing 32 and two auxiliary wings 33 having a wing chord length shorter than that of the main wing 32. Here, the fairing device 31 of the front side surface is disposed so that two auxiliary wings 33 are separated from each other in the vertical direction so as to sandwich the main wing 32 and are provided at both sides of the front side of the body surface of the vehicle 50 so as to be bilaterally symmetric to each other. On the other hand, the fairing device 31 of the rear lower surface is disposed so that two auxiliary wings 33 are separated from each other in the horizontal direction so as to sandwich the main wing 32 and are provided near the center of the lower surface of the rear bumper portion of the vehicle 50. In this way, since air is introduced from both sides of the vehicle 50, it is possible to prevent a problem in which an inflow of air is restricted when air is extracted in the road surface direction as in the related art and it is possible to effectively increase the acting force.

The fairing device 31 introduces a gas which flows to the side portion or the lower portion of the vehicle 50 and a peripheral airflow into the fairing device. Then, as in the above-described wing structure 1, the gas contacts the auxiliary wing 33 which is formed on the front part side of the main wing 32, the gas is guided between the auxiliary wing 33 and the main wing 32, and the gas is compressed when passing between the auxiliary wing 33 and the main wing 32, thereby appropriately forming a gas compression process region in the front part of the main wing 32. Accordingly, the internal energy of the gas may be converted into kinetic energy or mechanical energy by the adiabatic expansion in the expansion flow region. Further, a low-pressure region 81 is generated by the adiabatic expansion in the expansion flow region, a peripheral gas 82 is introduced thereinto, and the flow rate thereof increases with the given kinetic momentum, thereby increasing the acting force even at the low flow speed.

Figure 5:
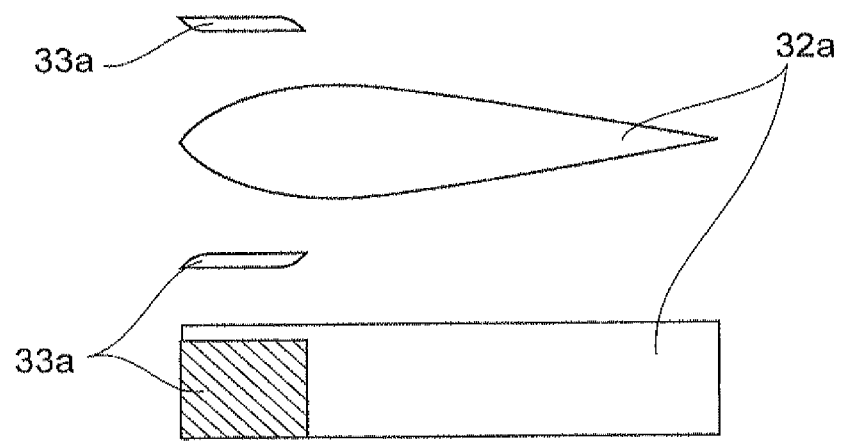
FIG. 5 is a schematic diagram illustrating a main wing and an auxiliary wing of the fairing device.

FIG. 5 is a schematic diagram illustrating a main wing and an auxiliary wing of a fairing device, and illustrates them from the upper surface and the side surface. A main wing 32a has a wing structure which has a thickness in the transverse direction (the width direction of the moving object), and two auxiliary wings 33a are positioned at the front side thereof. Each auxiliary wing 33a has a plate shape, and the side surface thereof has a square shape. In this way, when the two auxiliary wings 33a at the front side are disposed so as to be separated from each other with the main wing 32a interposed therebetween, a gas compression process region may be appropriately formed in the front part of the main wing 32a, the compression is efficiently performed, the approximately equivalent effect may be obtained at the same resistance (dynamic pressure resistance), and the sufficient acting force may be exhibited even at the low flow speed.

Figure 6:
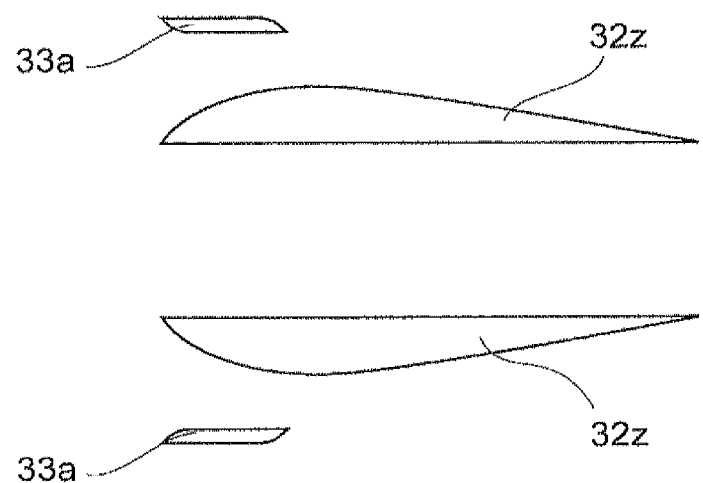
FIG. 6 is a schematic diagram illustrating a main wing and an auxiliary wing of a fairing device.
Figure 7:
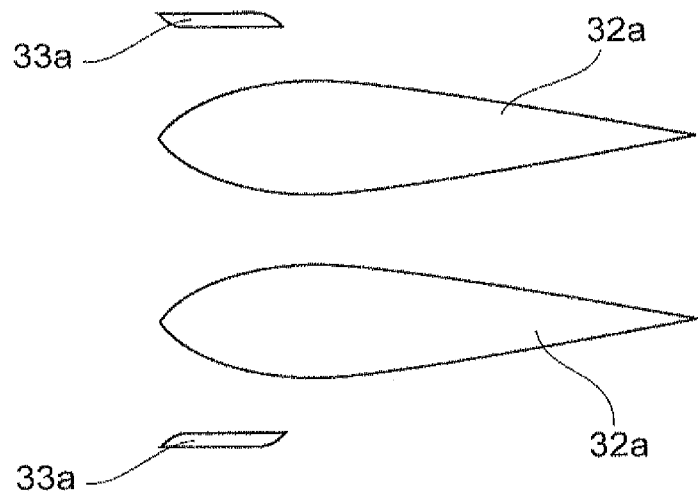
FIG. 7 is a schematic diagram illustrating a main wing and an auxiliary wing of a fairing device.
Figure 8:
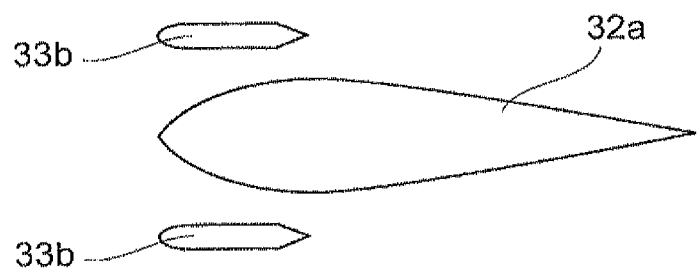
FIG. 8 is a schematic diagram illustrating a main wing and an auxiliary wing of a fairing device.

FIGS. 6 to 10 are also schematic diagrams illustrating a main wing and an auxiliary wing of a fairing device, where the shape of the main wing or the auxiliary wing is different from that of FIG. 5. FIG. 6 illustrates a main wing 32z in which the main wing 32a shown in FIG. 5 is divided into two pieces. Even in such a shape in which the main wing is divided into two pieces, since the two auxiliary wings 33a at the front side are positioned so as to sandwich the two main wings 32z, a compressing region is appropriately formed in the contraction flow region between the main wing 32z and the auxiliary wing 33a. Further, in FIG. 7, the fairing device includes two main wings 32a. However, even in such a shape, since the two auxiliary wings 33a at the front side are positioned so as to sandwich the two main wings 32a, the compression process region is appropriately formed in the contraction flow portion.

Figure 9:
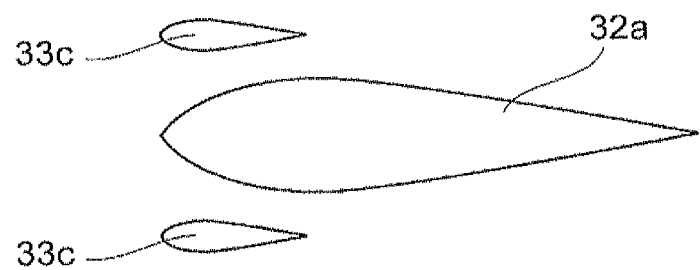
FIG. 9 is a schematic diagram illustrating a main wing and an auxiliary wing of a fairing device.
Figure 10:
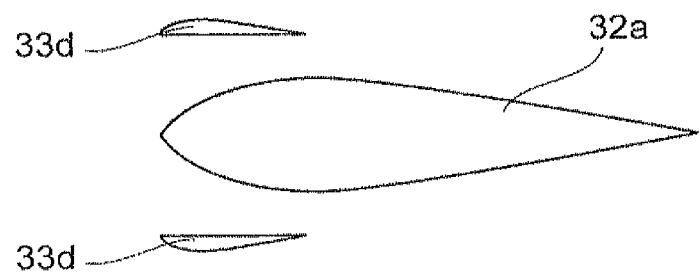
FIG. 10 is a schematic diagram illustrating a main wing and an auxiliary wing of a fairing device.

Further, even in a case where two auxiliary wings 33b are formed as a plate-shaped wing structure in the transverse direction (the thickness direction) (FIG. 8), a case where two auxiliary wings 33c are formed as the same bump shape as that of the main wing 32a (FIG. 9), or a case where an auxiliary wing 33d has a shape obtained by dividing the auxiliary wing 33c (FIG. 10), the compression process region may be appropriately formed in the contraction flow portion between the main wing and the auxiliary wing. Especially, as shown in FIG. 9, when the shape of the auxiliary wing 33c is formed as the same bump shape as that of the main wing 32a, a gas contacts the curved surface of the auxiliary wing 33c, the gas is guided between the auxiliary wing 33c and the main wing 32a, and the gas is compressed when passing between the auxiliary wing 33c and the main wing 32a, which is desirable in that a gas compression process region may be more appropriately formed on the surface of the main wing 32a.

Figure 11:
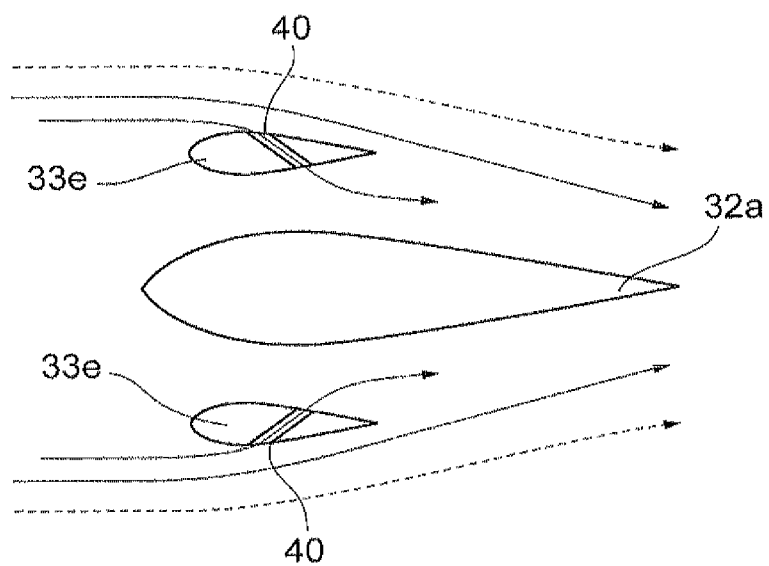
FIG. 11 is a schematic diagram illustrating a main wing and an auxiliary wing of a fairing device and a peripheral airflow.

FIG. 11 is a schematic diagram illustrating a fairing device and a peripheral airflow. As shown in FIG. 11, an auxiliary wing 33e is divided at the center thereof. A dividing portion 40 serves as a slit. Since the air which flows to the outside of the auxiliary wing 33e (the opposite side of the main wing 32a) is introduced between the main wing 32a and the auxiliary wing 33e, the amount of a gas which flows into the expansion flow region may be increased. Further, when the auxiliary wing 33e is disposed at the further front side, the amount of a gas which flows into the contraction flow region may be increased.

Figure 12:
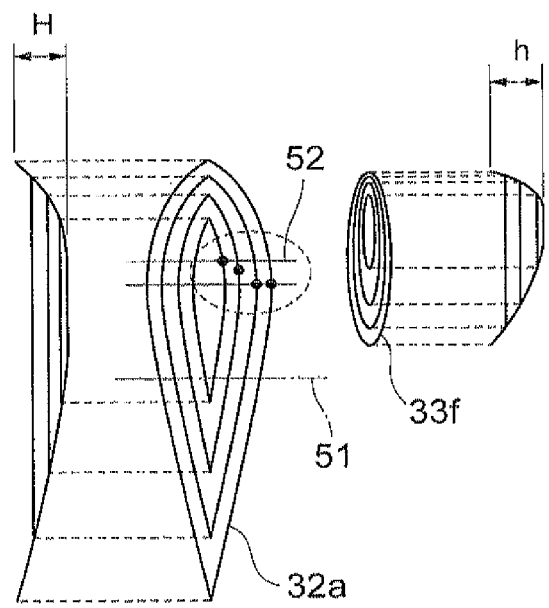
FIG. 12 is a schematic diagram illustrating respective constant-height surfaces and heights of the main wing and the auxiliary wing.

FIG. 12 is a schematic diagram illustrating the respective constant-height surfaces and the heights of the main wing and the auxiliary wing. In each constant-height surface of the main wing $32a$, a maximal thickness position 52 which is the thickest is positioned at the front side in relation to the longitudinal center 51, and the main wing $32a$ has a height H. Further, although the auxiliary wing $33f$ has a height h, when the height h of the auxiliary wing is equal to or smaller than the half of the height H of the main wing, the compressing effect may be noticeably degraded. For this reason, it is desirable that the height h of the auxiliary wing is equal to or larger than the height H of the main wing.

Figure 13:
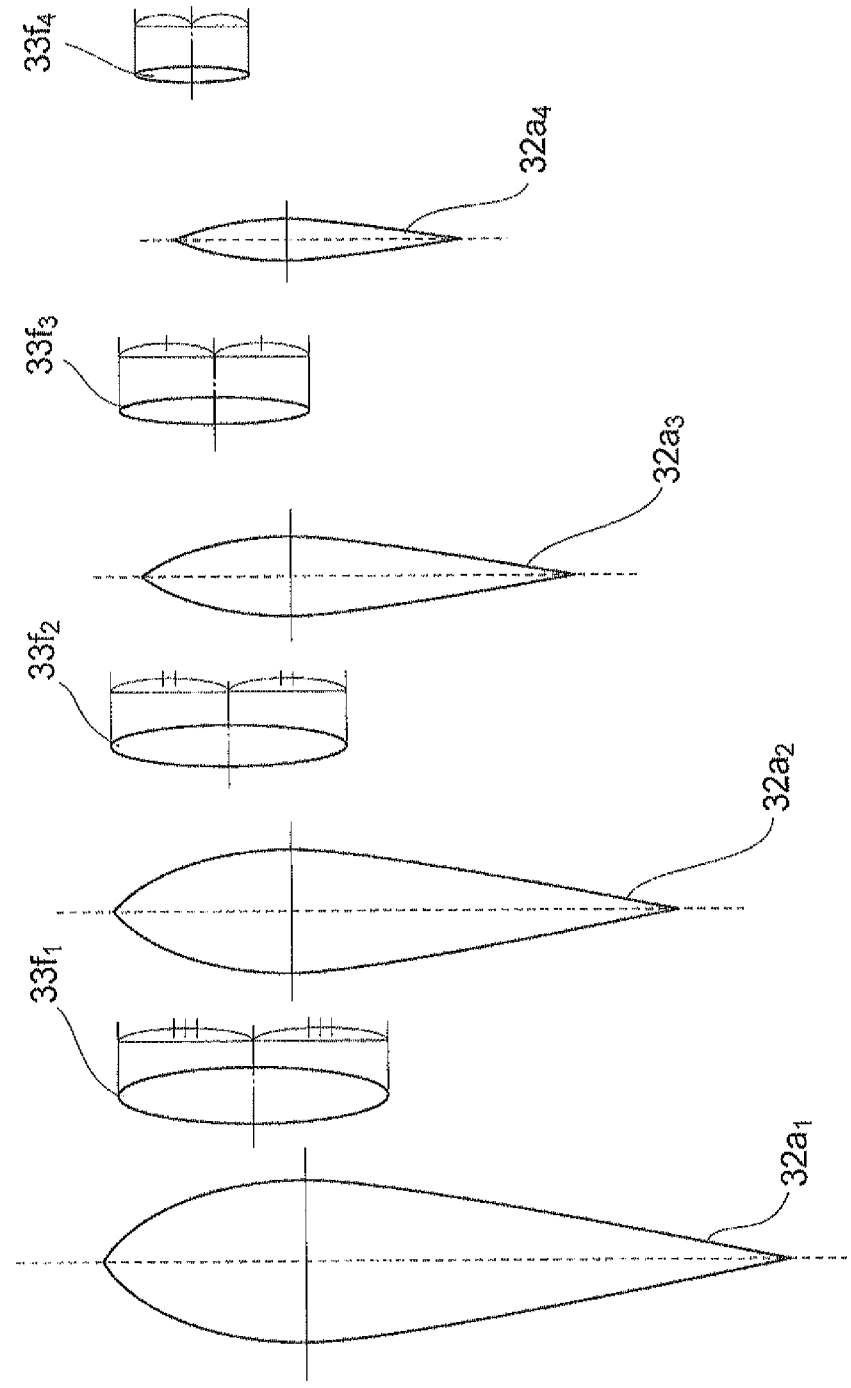
FIG. 13 is a schematic diagram illustrating a positional relationship between the respective constant-height surfaces of the main wing and the auxiliary wing.

FIG. 13 is a schematic diagram illustrating a positional relationship between the respective constant-height surfaces of the main wing and the auxiliary wing. In a constant-height surface $32a_1$ of the lowest main wing and a constant-height surface $33f_1$ of the lowest auxiliary wing, the longitudinal center of the auxiliary wing (the center of the moving object in the front-rear direction) is positioned at the front side in relation to the maximal thickness position of the main wing. Further, even in the constant-height surfaces $32a_2$ to $32a_4$ of the main wing and the constant-height surface $33f_2$ to $33f_4$ of the auxiliary wing, the longitudinal center of the auxiliary wing is positioned at the front side in relation to the maximal thickness position of the main wing. In this way, when the longitudinal center position of the auxiliary wing is present at the front side in relation to the maximal thickness position of the main wing in a half or more of the constant-height surface, the effect of the compression may be improved while sufficiently ensuring the external air which flows into the expansion flow portion. Such a fairing device technically enables a practical design without causing excessive calculation.

Figure 14:
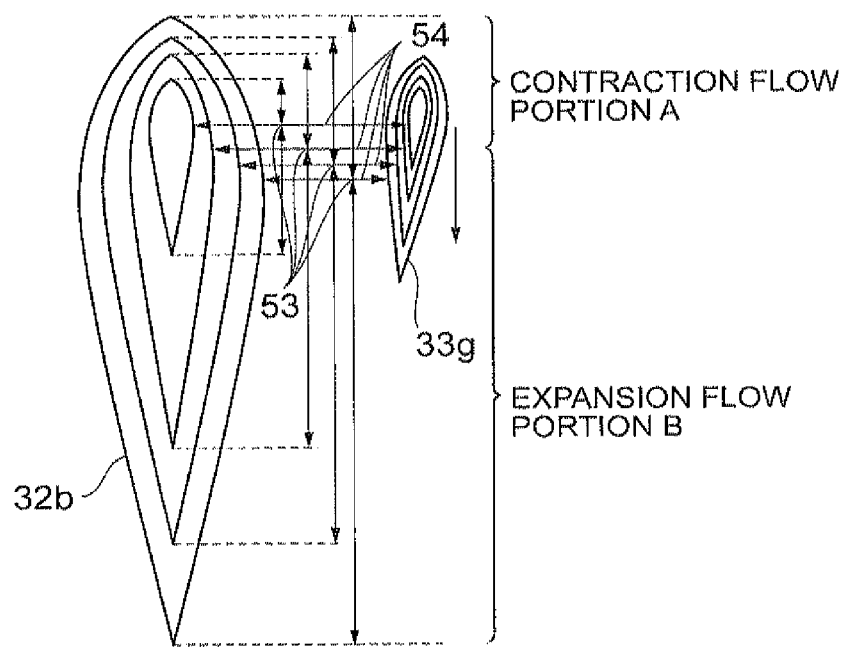
FIG. 14 is a schematic diagram illustrating a positional relationship between the respective constant-height surfaces of the main wing and the auxiliary wing.
Figure 15:
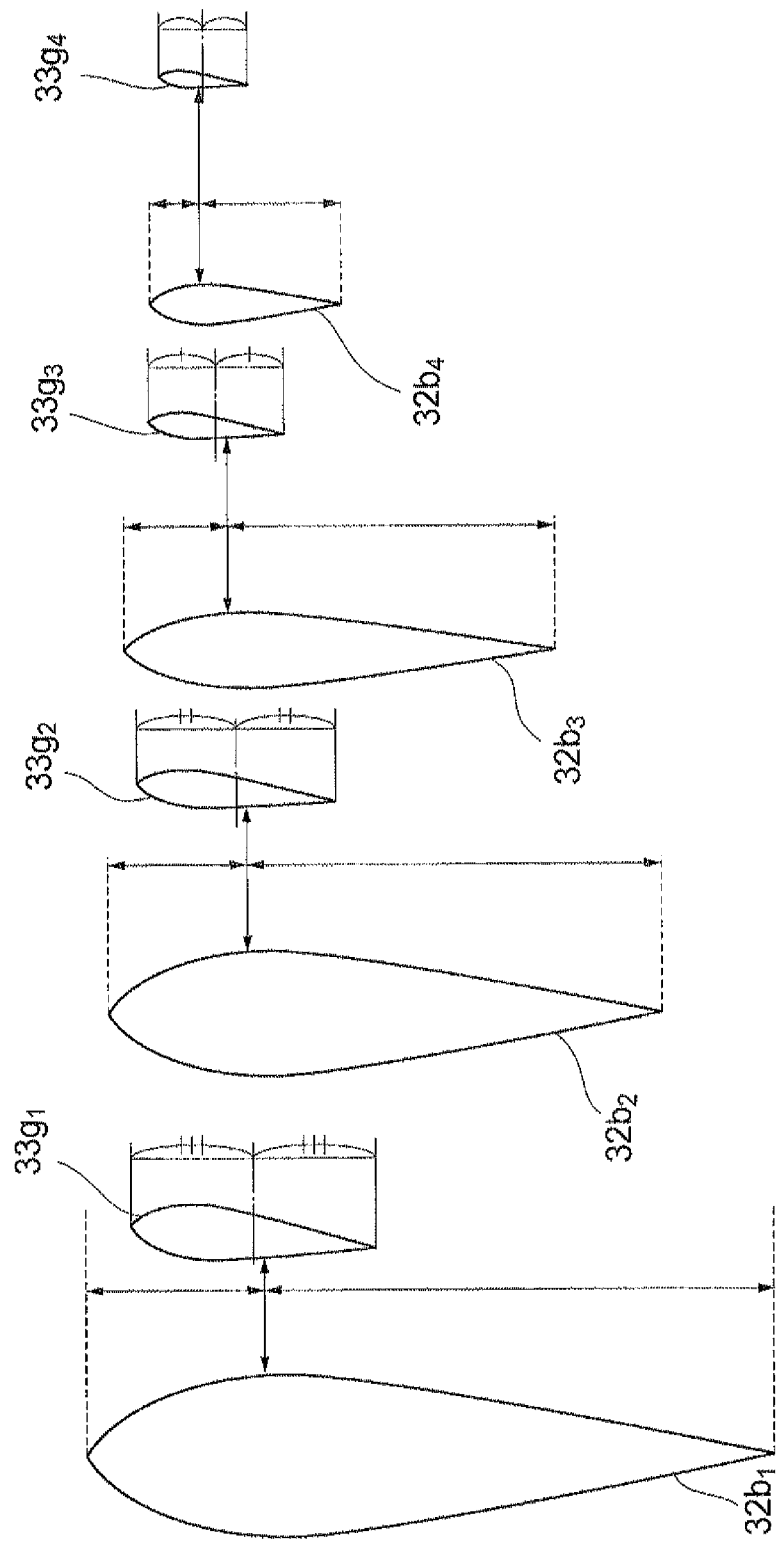
FIG. 15 is a schematic diagram illustrating a positional relationship between the respective constant-height surfaces of the main wing and the auxiliary wing.

FIGS. 14 and 15 are schematic diagrams illustrating a positional relationship between the respective constant-height surfaces of the main wing and the auxiliary wing. As shown in FIG. 14, when a closest portion 54 in each constant-height surface of a main wing $32b$ and an auxiliary wing $33g$ is set as a boundary point 53 between the contraction flow portion A and the expansion flow portion B in the longitudinal direction of each constant-height surface, when the longitudinal center of the auxiliary wing $33g$ is positioned at the front side in relation to the boundary point 53, it is desirable in that the compression may be improved while sufficiently ensuring the external air which flows into the expansion flow portion.

In FIG. 15, the longitudinal center position of each of the constant-height surfaces $33g_1$ to $33g_3$ of the auxiliary wing is positioned at the front side in relation to the boundary point of each of the constant-height surfaces $32b_1$ to $32b_3$ of the main wing. However, only the longitudinal center position of the constant-height surface $33g_4$ of the auxiliary wing is positioned at the rear side in relation to the boundary point of the constant-height surface $32b_4$ of the main wing. In this way, when the ratio of the constant-height surface in which the longitudinal center of the auxiliary wing is positioned at the front side in relation to the boundary point of the main wing is a half or more, it is desirable in that the effect is obtained in the entire fairing device.

Figure 16:
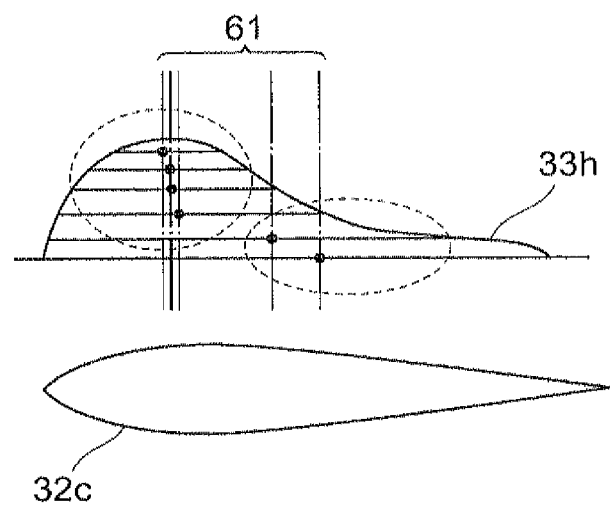
FIG. 16 is a schematic diagram illustrating a positional relationship between a boundary point of the main wing and a longitudinal center of the auxiliary wing.

FIG. 16 is a schematic diagram illustrating a positional relationship between the boundary point of the main wing and the longitudinal center of the auxiliary wing. In a side surface of an auxiliary wing $33h$ of FIG. 16, a shape is formed in which the height h of the auxiliary wing $33h$ is not uniform in the longitudinal direction thereof. In this way, even when the height of the auxiliary wing $33h$ is not uniform in the longitudinal direction, it is desirable that the ratio of the constant-height surface positioned at the front side in relation to the boundary point of the main wing $32c$ with respect to the longitudinal center of each constant-height surface is a half or more.

Figure 17:
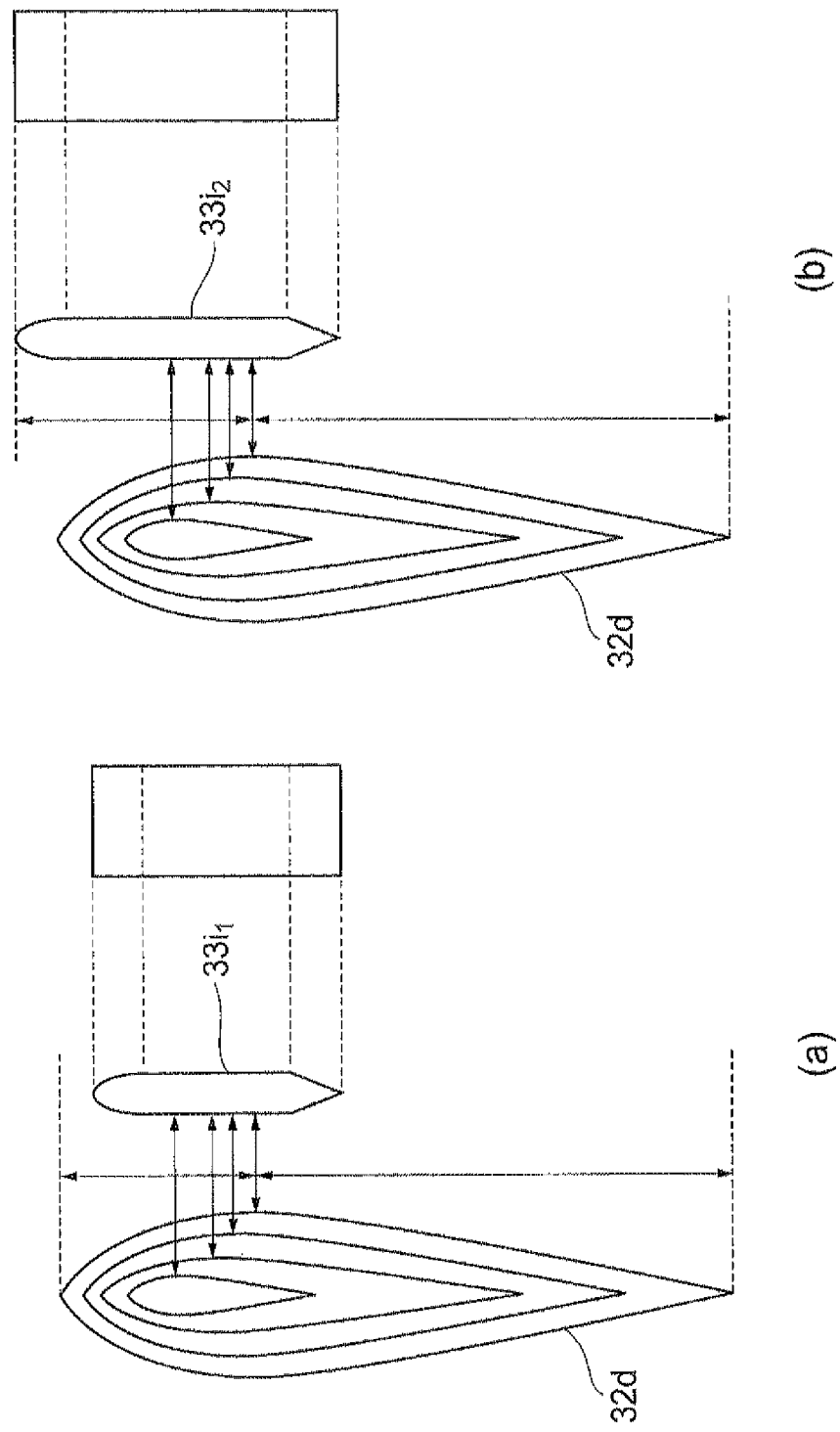
FIG. 17(a) illustrates a case where the auxiliary wing is positioned in rear of the main wing and FIG. 17(b) illustrates a case where the auxiliary wing is positioned in front of the main wing.

FIG. 17($a$) is a schematic diagram illustrating a case where the auxiliary wing is positioned at the rear side in relation to the main wing, and FIG. 17($b$) is a schematic diagram illustrating a case where the auxiliary wing is positioned at the front side in relation to the main wing. As shown in FIG. 17($a$), when the auxiliary wing $33i_1$ (with a thick plate shape in the transverse direction) is inclined downward in relation to the main wing $32d$, the dynamic pressure may be comparatively small. Further, as shown in FIG. 17($b$), when the auxiliary wing $33i_2$ is positioned at the front side in relation to the main wing $32d$, the compression process region of the air frame may be appropriately formed.

Figure 18:
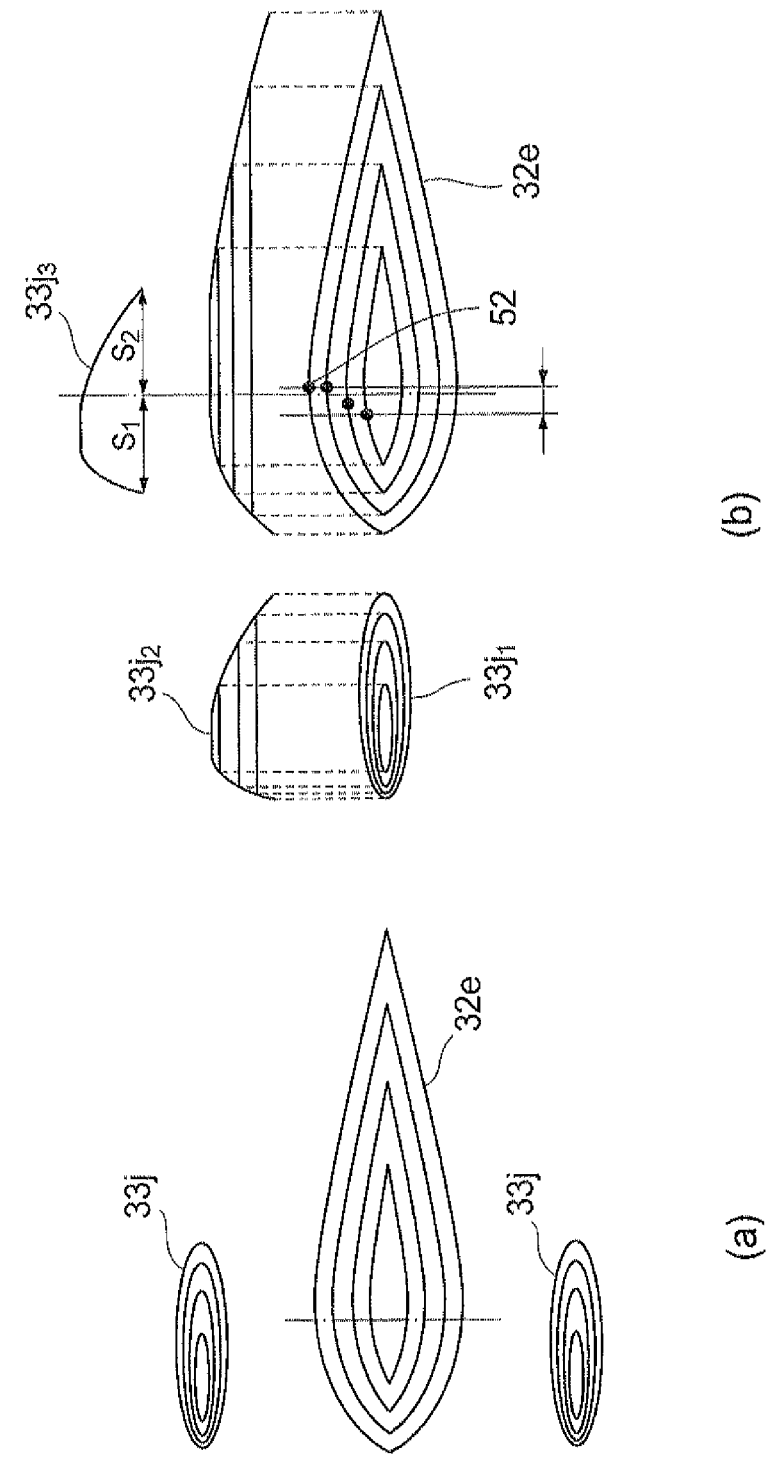
FIG. 18(a) is a schematic diagram illustrating a fairing device including a main wing and two auxiliary wings and FIG. 18(b) is a schematic diagram illustrating a projection region of the auxiliary wing with respect to the main wing and the constant-height surfaces of the main wing and the auxiliary wing.

FIG. 18($a$) is a schematic diagram illustrating a fairing device which includes a main wing and two auxiliary wings, and FIG. 18($b$) is a schematic diagram illustrating a projection area of the auxiliary wing with respect to the main wing and the constant-height surfaces of the main wing and the auxiliary wing. As shown in FIG. 18($a$), when an auxiliary wing $33j$ faces a main wing $32e$ which extends up to the expansion flow portion, it is desirable that the main wing $32e$ and the auxiliary wing $33j$ overlap each other as much as possible in the longitudinal direction. As shown in FIG. 18($b$), when a side surface $33j_2$ of the auxiliary wing $33j_1$ is projected to the side surface of the main wing $32e$ in the direction perpendicular to the longitudinal direction, it is desirable that the projection area $S_1$ in the contraction flow portion of the main wing $32e$ is larger than the projection area $S_2$ in the expansion flow portion of the main wing $32e$ in a projection surface $33j_3$. This is because it is important to reliably transmit the flow of a gas to the expansion flow, that is, the expansion.

Figure 19:
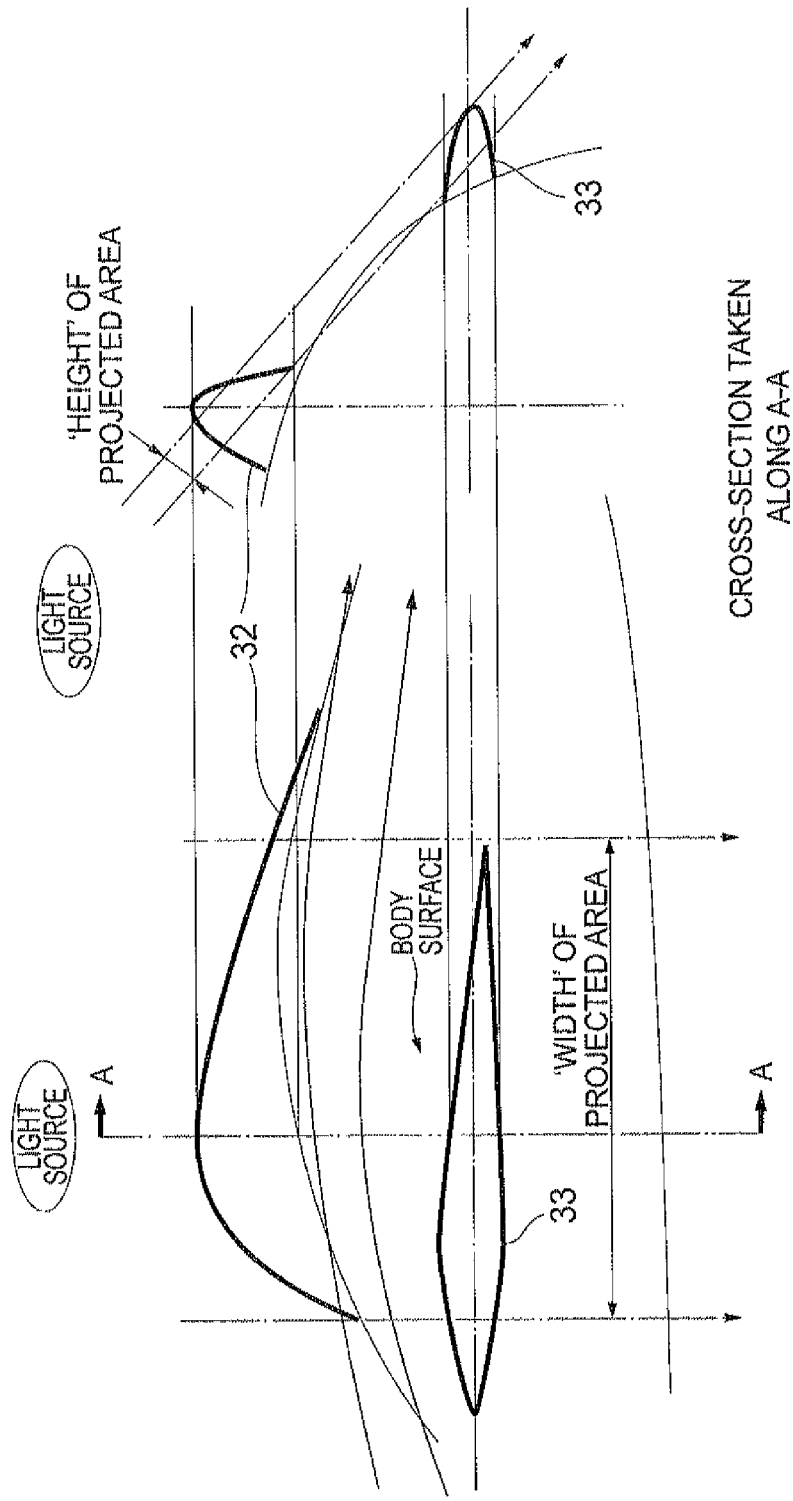
FIG. 19 is a schematic diagram illustrating an example of a width and a height of a projection area when light is projected to the main wing and the auxiliary wing disposed in the body surface of the vehicle.

FIG. 19 is a schematic diagram illustrating an example of the width and the height of the projection area when light is projected to the main wing and the auxiliary wing disposed in the body surface of the vehicle. FIG. 19 corresponds to a case where the auxiliary wing 33 is projected by the light source from the main wing 32, and even in such a projection, the projection area may be calculated from the projected width and height.

Figure 20:
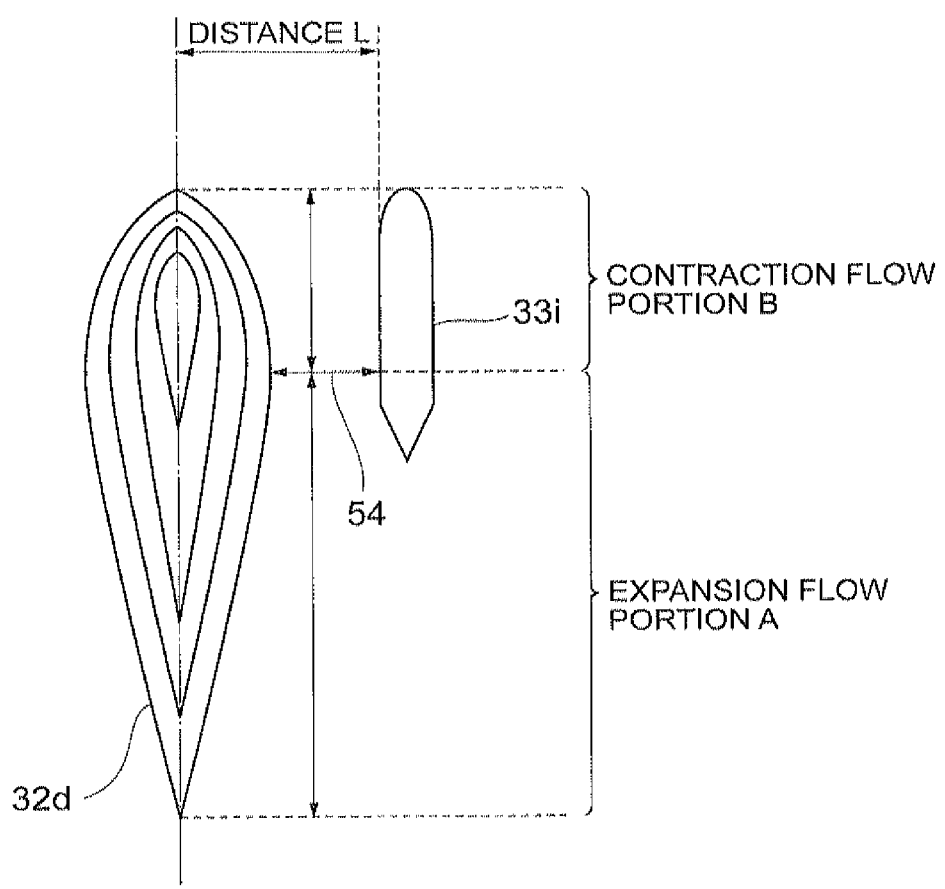
FIG. 20 is a schematic diagram illustrating a distance between the main wing and the auxiliary wing and the closest portion.

FIG. 20 is a schematic diagram illustrating a distance between the main wing and the auxiliary wing and the closest portion. The distance L between the transverse center of the main wing $32d$ and the auxiliary wing $33i$ and the length C between the maximal thickness position of the main wing $32d$ and the closest portion 54 of the auxiliary wing $33i$ are desirably $L/C>1.05$ when the flow speed (Mach number (Ma)) of the fluid flowing between the main wing $32d$ and the auxiliary wing $33i$ is Ma<0.3 and are desirably $L/C≤1.05$ when Ma≥0.3. The Mach number of 0.3 corresponds to a change in the volume from about 3 to 5%, and the distance L has an aerodynamic influence. That is, the distance corresponds to a state where the volume of the fluid may be compressed to an extent of about 5% or more.

Figure 21:
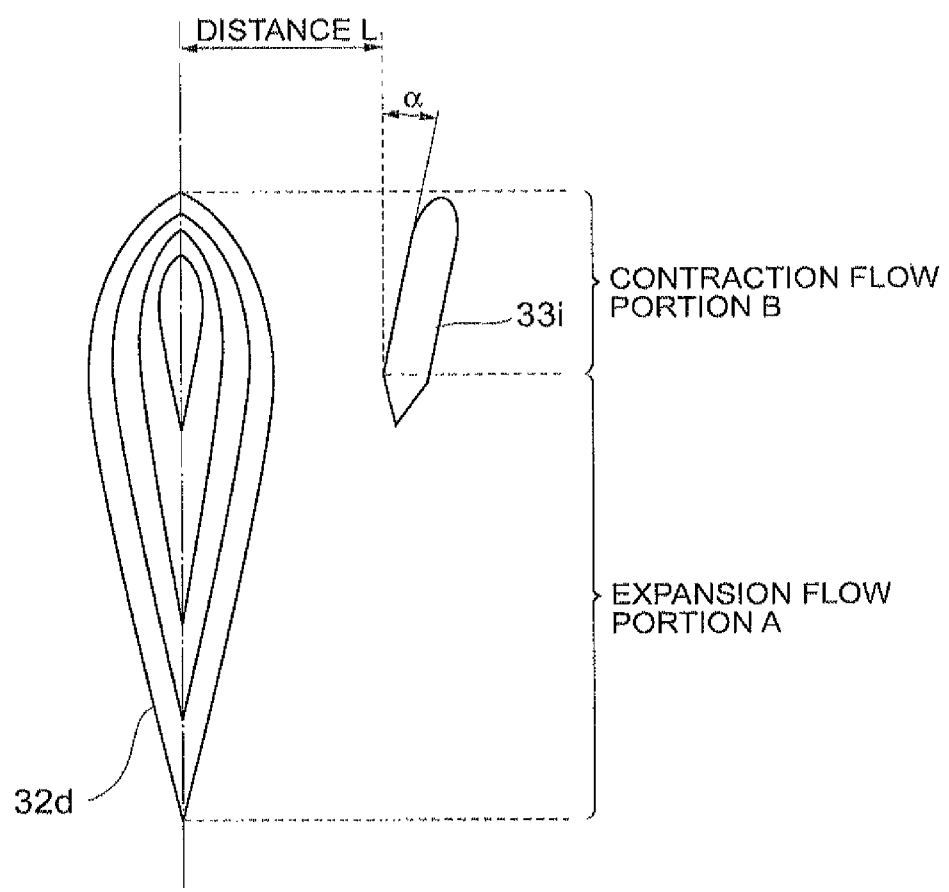
FIG. 21 is a schematic diagram illustrating a distance and an angle of the main wing and the auxiliary wing.

FIG. 21 is a schematic diagram illustrating a distance and an angle of the main wing and the auxiliary wing. After the compression, the ratio contributing to the volume expansion during the adiabatic expansion and the ratio contributing to an increase in the temperature are dependent on the type of the fluid molecule or the temperature of the system (the start temperature). Therefore, it is desirable to change the distance L or the angle α in accordance with the type of the fluid or the temperature thereof at that time.

Figure 22:
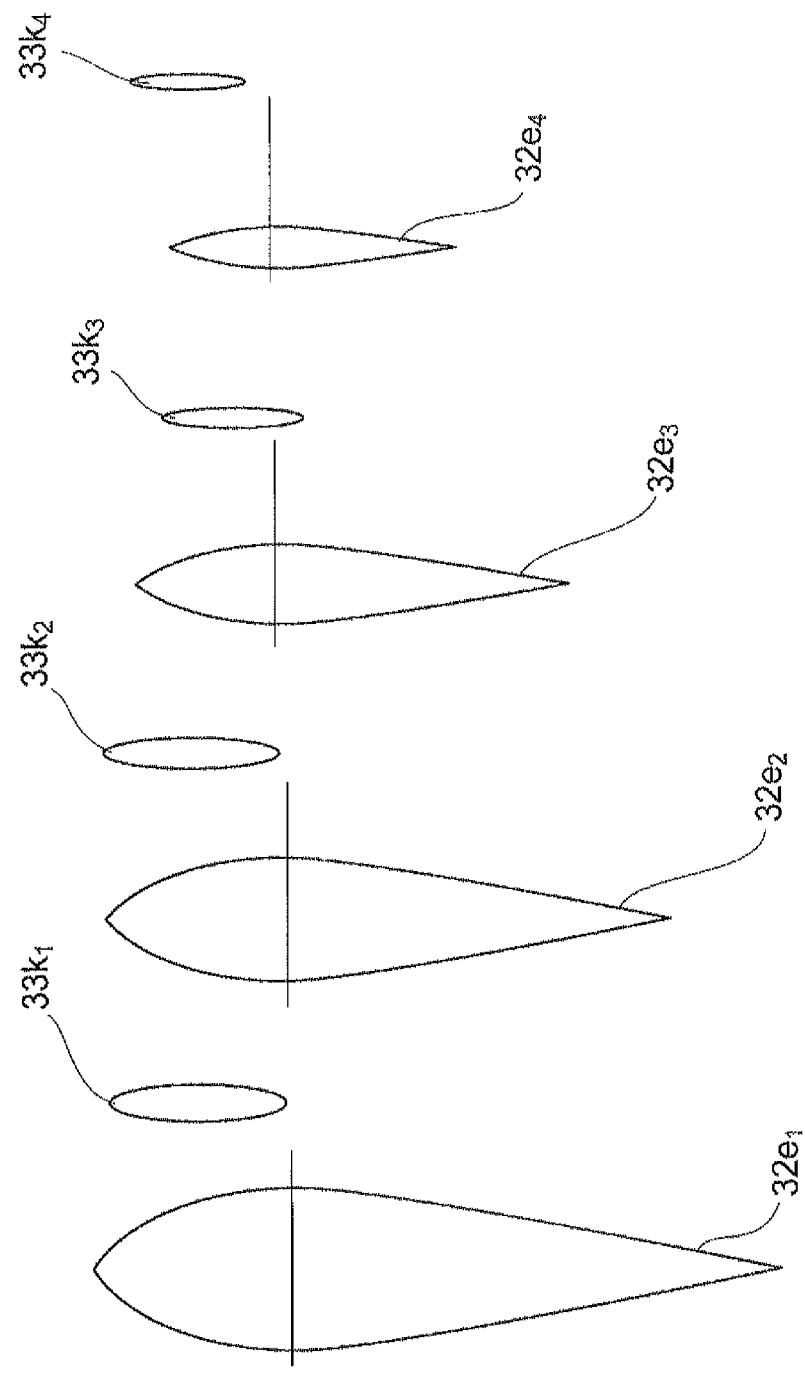
FIG. 22 is a schematic diagram illustrating a positional relationship between a maximal thickness position of the main wing and the auxiliary wing.
Figure 23:
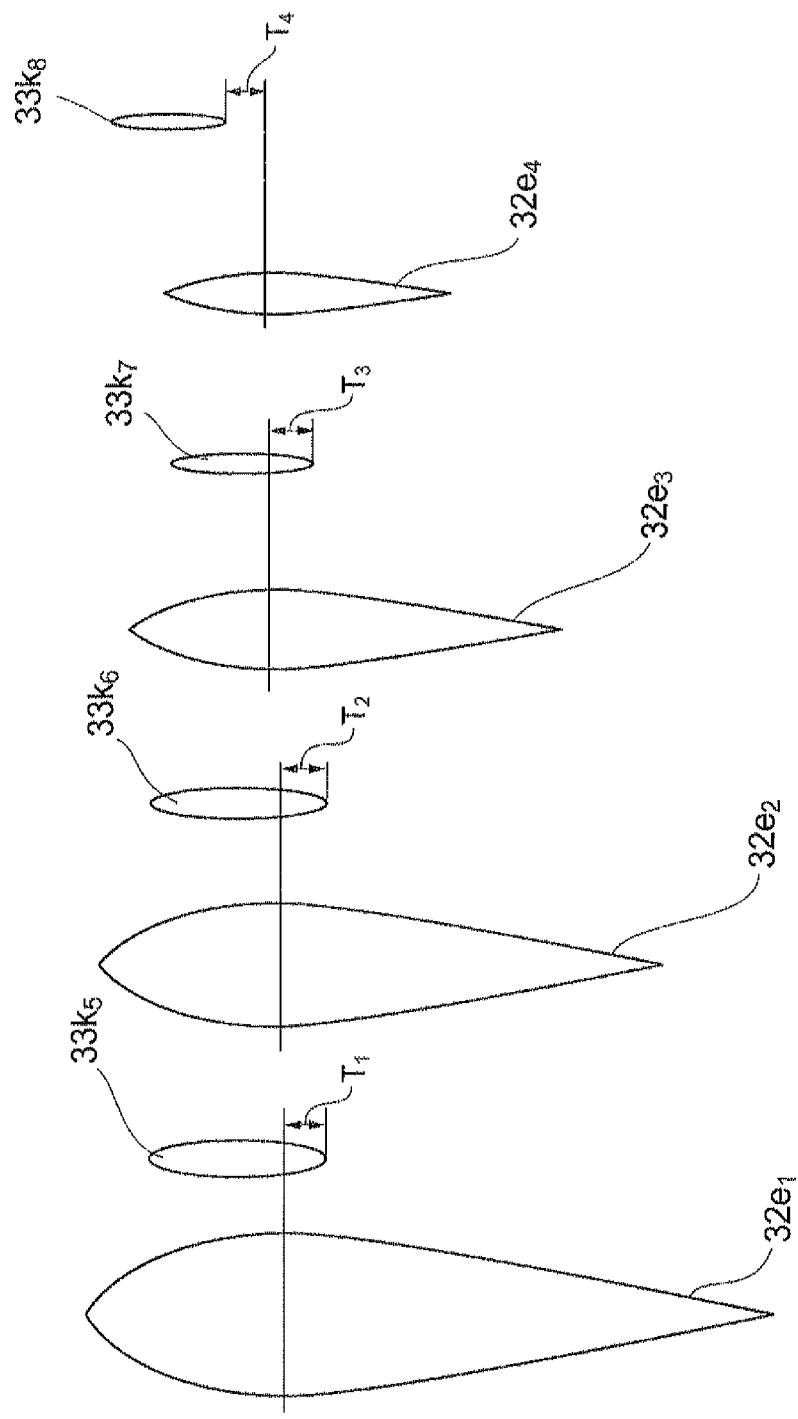
FIG. 23 is a schematic diagram illustrating a positional relationship between the maximal thickness position of the main wing and the auxiliary wing.

FIGS. 22 and 23 are schematic diagrams illustrating a positional relationship between the maximal thickness position of the main wing and the auxiliary wing. In FIG. 22, the constant-height surfaces $33k_1$, $33k_2$, and $33k_4$ of the auxiliary wing are positioned at the front side in relation to the maximal thickness position of the constant-height surfaces $32e_1$, $32e_2$, and $32e_4$ of the main wing, and only the constant-height surface $33k_3$ of the auxiliary wing is positioned at the rear side in relation to the maximal thickness position of the constant-height surface $32e_3$ of the constant-height surface $32e_3$ of the main wing. In this way, the ratio satisfying the condition that the auxiliary wing is positioned at the front side in relation to the maximal thickness position of the main wing in the constant-height surface is desirably 50% or more and more desirably 75% or more.

In FIG. 23, it is desirable that the protrusion amounts $T_1$ to $T_3$ of the constant-height surfaces $33k_5$ to $33k_7$ of the auxiliary wing protruding backward from the maximal thickness position in the constant-height surfaces $32e_1$ to $32e_3$ of the main wing is 35% or less, that is, 65% or more of the auxiliary wing is positioned at the front side of the maximal thickness position of the main wing 32. In this way, in each constant-height surface, the ratio satisfying a condition that 65% or more of the auxiliary wing is positioned at the front side of the maximal thickness position of the main wing 32 is desirably 50% or more and more desirably 75% or more.

Figure 24:
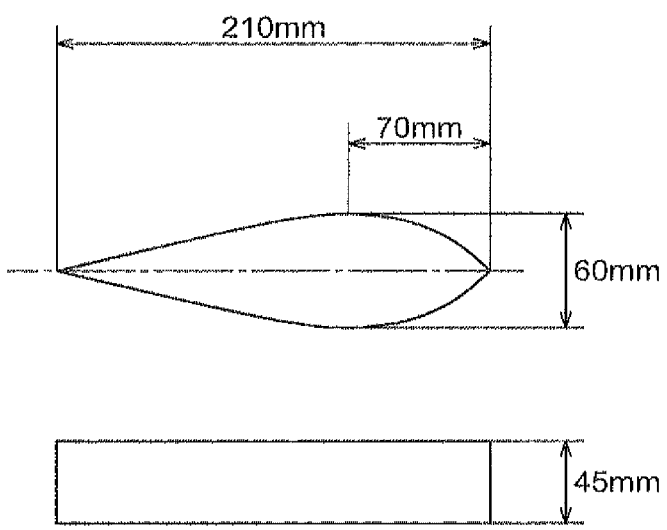
FIG. 24 is a diagram illustrating an arrangement when the auxiliary wing is not provided in the experiment of the fairing device.
Figure 25:
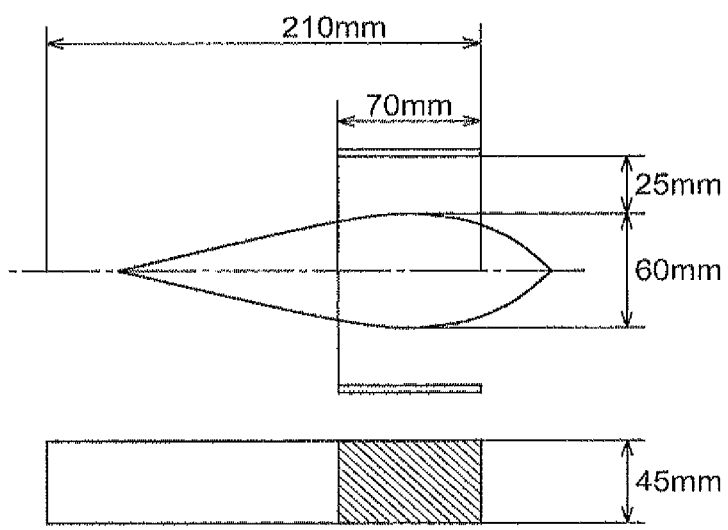
FIG. 25 is a diagram illustrating an arrangement when the auxiliary wing is provided in the contraction flow portion in the experiment of the fairing device.
Figure 26:
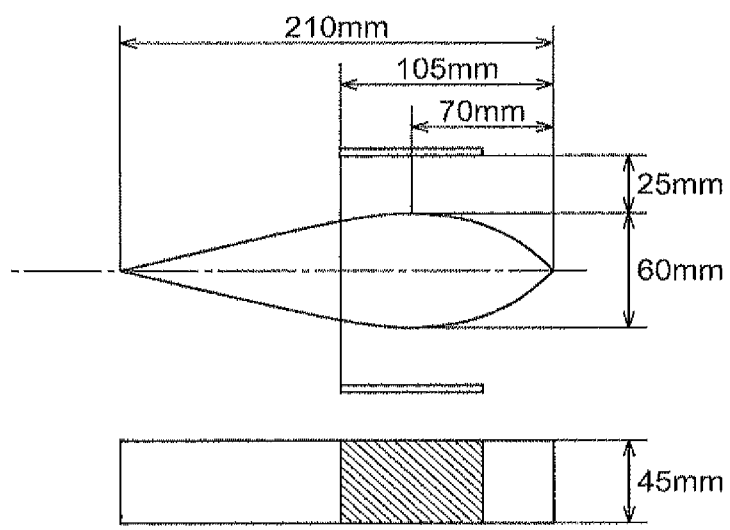
FIG. 26 is a diagram illustrating an arrangement when the auxiliary wing is provided between the contraction flow portion and the expansion flow portion in the experiment of the fairing device.
Figure 27:
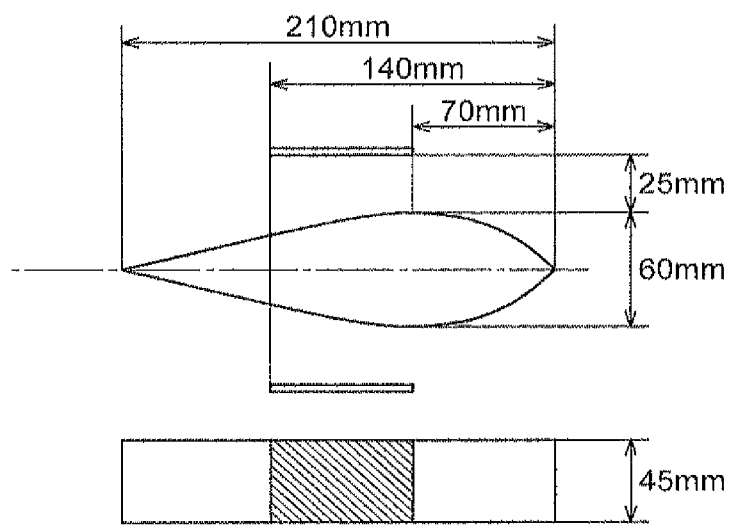
FIG. 27 is a diagram illustrating an arrangement when the auxiliary wing is provided in the expansion flow portion in the experiment of the fairing device.

Furthermore, in order to verify the effect of the fairing device of the invention, an experiment using a small wind tunnel device is performed. Hereinafter, the experiment results are shown by using the pictures. Furthermore, in the present experiment, a main wing is used of which the entire length is 210 mm, the length from the leading part to the maximal thickness position is 70 mm, the transverse width (the thickness) is 60 mm, and the height is 45 mm. Further, the arrangement when the auxiliary wing is not provided is shown in FIG. 24, the case where the auxiliary wing is disposed at the contraction flow portion is shown in FIG. 25, the case where the auxiliary wing is provided between the contraction flow portion and the expansion flow portion is shown in FIG. 26, and the case where the auxiliary wing is provided in the expansion flow portion is shown in FIG. 27.

Figure 28:
FIG. 28 is a picture illustrating a difference in the flow of the fluid according to the position of the auxiliary wing.
Figure 29:
FIG. 29 is a picture illustrating a difference in the flow of the fluid according to the position of the auxiliary wing.
Figure 30:
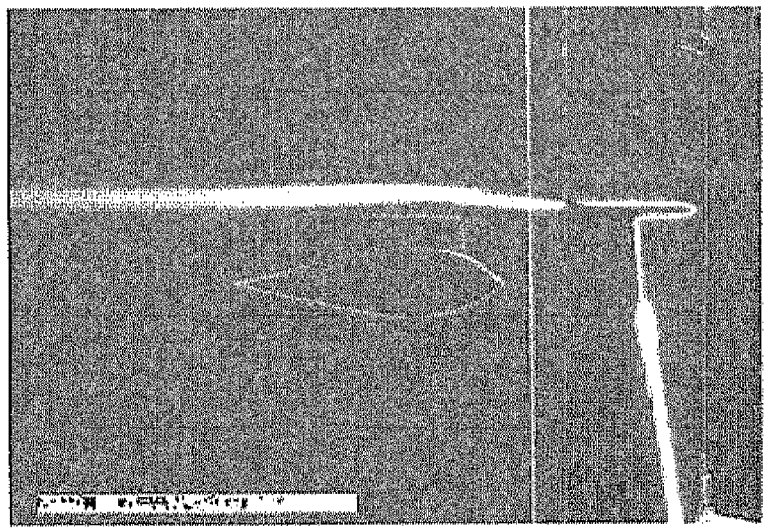
FIG. 30 is a picture illustrating a difference in the flow of the fluid according to the position of the auxiliary wing.
Figure 31:
FIG. 31 is a picture illustrating a difference in the flow of the fluid according to the position of the auxiliary wing.

FIGS. 28 to 31 are pictures illustrating a difference in the flow of the fluid according to the position of the auxiliary wing, where a handheld smoke generator is attached to a position of 25 mm from a wall and a smoke as a fluid is made to flow at the wind speed of 20 m/s. In FIG. 28, only the main wing is provided without the auxiliary wing, and the peripheral fluid is slightly attracted toward the main wing in the expansion flow portion. In FIG. 29, the auxiliary wing is provided in the contraction flow portion, the peripheral fluid is attracted from the further outside so as to be attached toward the main wing in the expansion flow portion. On the other hand, as shown in FIGS. 30 and 31, as the auxiliary wing moves closer to the expansion flow portion, the effect of attracting the peripheral fluid becomes smaller. Especially, as shown in FIG. 31, when the auxiliary wing is provided in the expansion flow portion, the attraction of the peripheral fluid toward the expansion flow portion is reduced.

Figure 32:
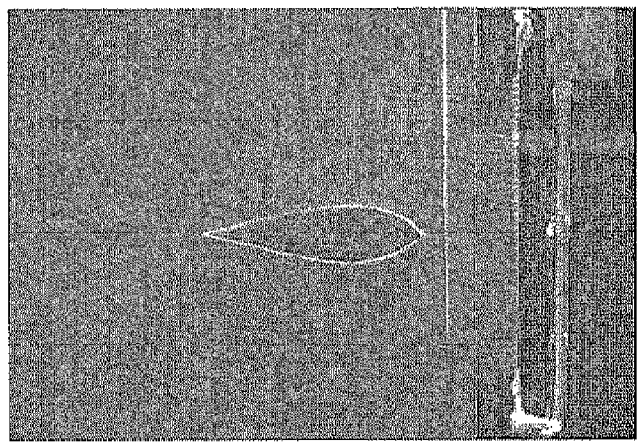
FIG. 32 is a picture illustrating a difference in the flow of the fluid according to the position of the auxiliary wing.
Figure 33:
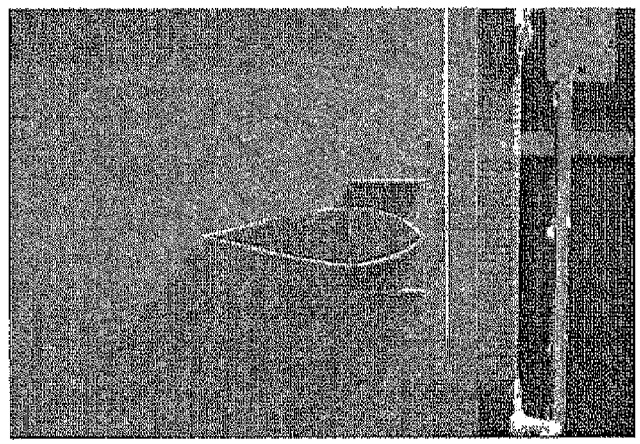
FIG. 33 is a picture illustrating a difference in the flow of the fluid according to the position of the auxiliary wing.
Figure 34:
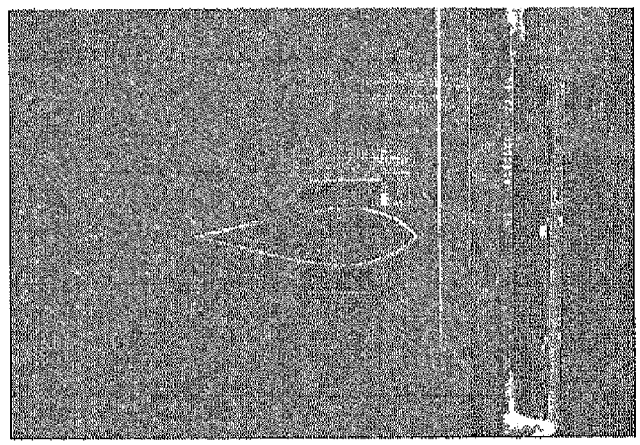
FIG. 34 is a picture illustrating a difference in the flow of the fluid according to the position of the auxiliary wing.
Figure 35:
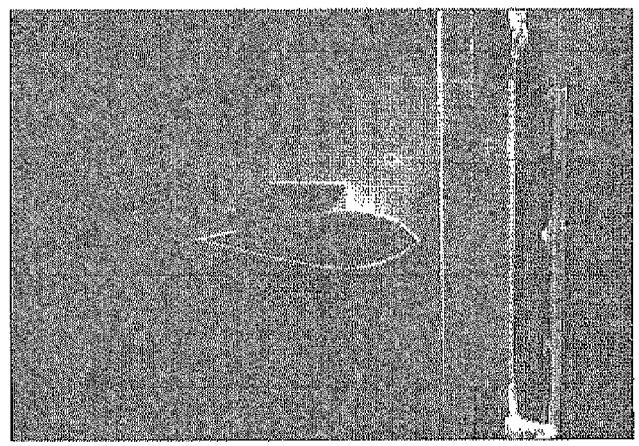
FIG. 35 is a picture illustrating a difference in the flow of the fluid according to the position of the auxiliary wing.
Figure 36:
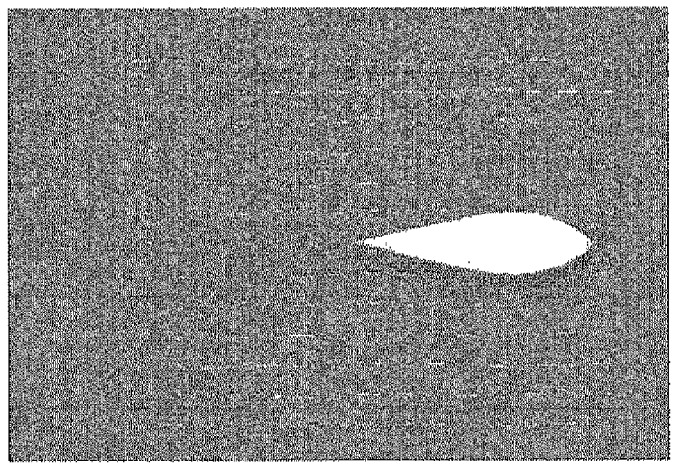
FIG. 36 is a picture illustrating a difference in the flow of the fluid according to the position of the auxiliary wing.
Figure 37:
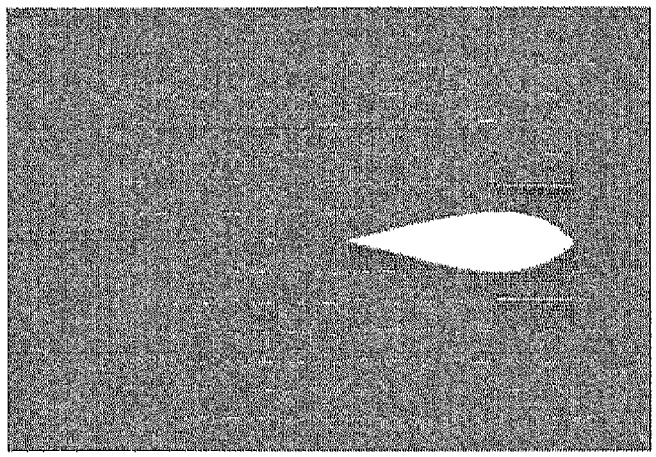
FIG. 37 is a picture illustrating a difference in the flow of the fluid according to the position of the auxiliary wing.

FIGS. 32 to 35 are pictures illustrating a difference in the flow of the fluid according to the position of the auxiliary wing, where a smoke generator using a heating of a heating wire is attached to a position of 25 mm from a wall and a smoke as a fluid is made to flow at the wind speed of 20 m/s. In FIG. 32, since only the main wing is provided without the auxiliary wing, the peripheral fluid is slightly attracted toward the main wing. On the other hand, in FIG. 33, since the auxiliary wing is provided in the contraction flow portion, it is found that the action of attracting the peripheral fluid is effective when the escaping of air to the outside of the wing in the contraction flow portion is suppressed (the compression action is promoted) and the inflow of the peripheral fluid in the expansion flow portion the peripheral fluid is not disturbed. Further, as shown in FIGS. 34 and 35, as the auxiliary wing becomes closer to the expansion flow portion, the attracting effect becomes smaller. Especially as shown in FIG. 35, when the auxiliary wing is provided in the expansion flow portion, it becomes clear that the attraction of the peripheral fluid is degraded. From these, the range with a difference in the compression is wide when the attraction range is wide, which is estimated that there is one factor of improving the traveling safety of the moving object.

Figure 38:
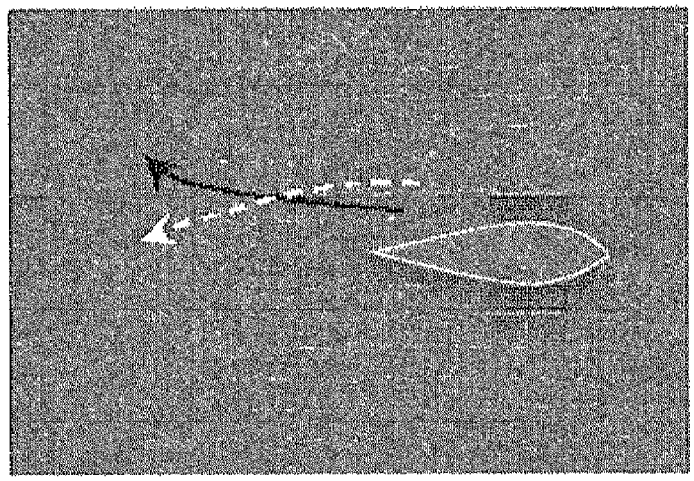
FIG. 38 is a picture illustrating a difference in the flow of the fluid according to the position of the auxiliary wing.
Figure 39:
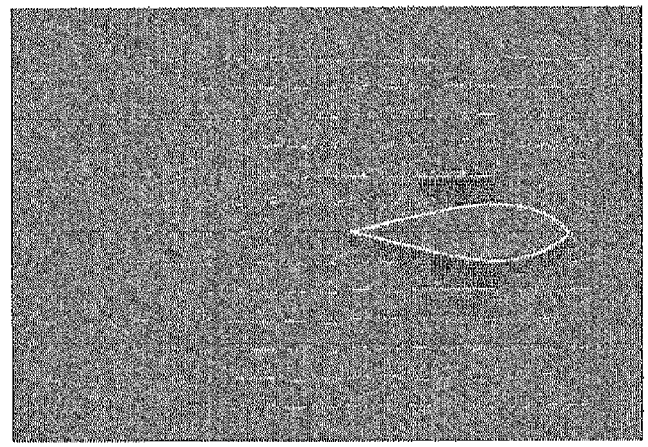
FIG. 39 is a picture illustrating a difference in the flow of the fluid according to the position of the auxiliary wing.
Figure 40:
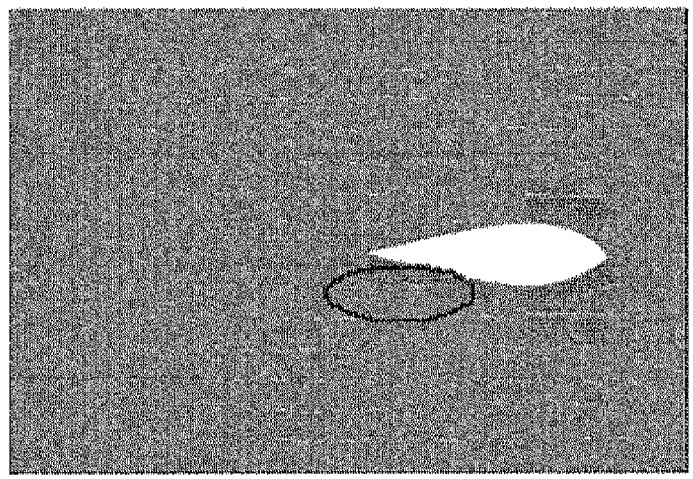
FIG. 40 is a picture illustrating a difference in the flow of the fluid according to the position of the auxiliary wing.
Figure 41:
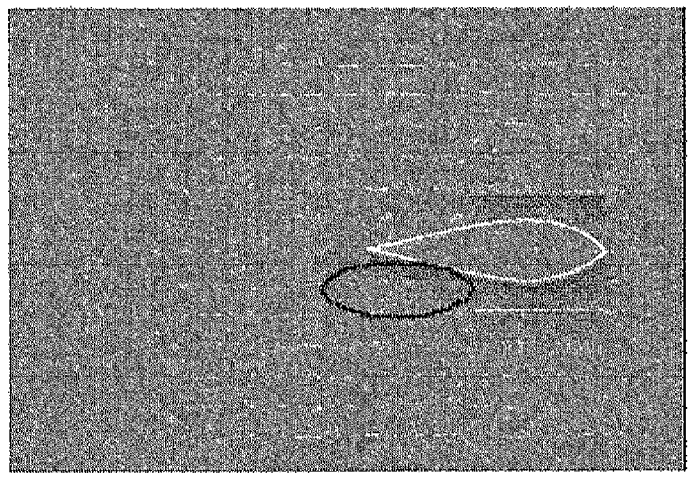
FIG. 41 is a picture illustrating a difference in the flow of the fluid according to the position of the auxiliary wing.
Figure 42:
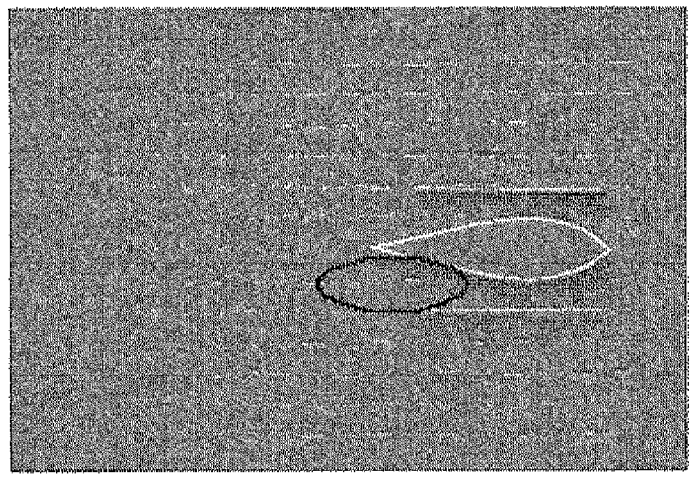
FIG. 42 is a picture illustrating a difference in the flow of the fluid according to the position of the auxiliary wing.
Figure 43:
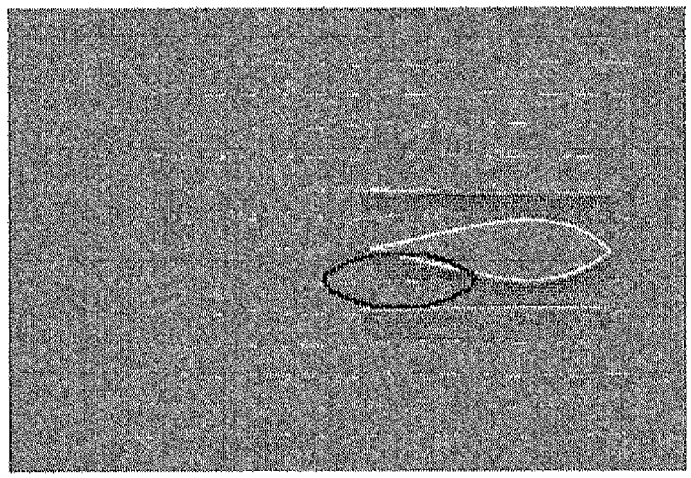
FIG. 43 is a picture illustrating a difference in the flow of the fluid according to the position of the auxiliary wing.

FIGS. 36 to 39 are pictures illustrating a difference in the flow of the fluid according to the position of the auxiliary wing, where two types of tufts with a height 45 mm and a height 22 mm were provided and air was made to flow at the wind speed of 20 m/s. Among these, as shown in FIG. 38, when the auxiliary wing is provided between the contraction flow portion and the expansion flow portion, the tufts with a height of 22 mm have a flow moving close to the expansion flow portion, but the tufts with a height of 45 mm have a flow moving away from the expansion flow portion. It was found that the flowing direction is different due to a difference in the height.

FIGS. 40 to 43 are pictures illustrating a difference in the flow of the fluid according to the position of the auxiliary wing. The auxiliary wing is disposed in the contraction flow portion in FIG. 40, but the length of the auxiliary wing extends toward the expansion flow portion up to 1/3 of the expansion flow portion in FIG. 41, up to 2/3 of the expansion flow portion in FIG. 42, and up to 3/3 of the expansion flow portion in FIG. 43. Then, air is made to flow at the wind speed of 20 m/s. In FIGS. 40 to 43, as apparent from the flow of the portion enclosed by the frame border near the expansion flow portion of the main wing, even when the compression in the contraction flow portion is promoted, if there is a barrier (for example, the rear half portion of the auxiliary wing) of the expansion flow portion, the attraction effect near the expansion flow portion of the main wing is reduced. This is estimated that the flow is affected by the pressure of the peripheral air and the Coanda effect observed near the surface of the wing is also affected by not only the viscosity, but also the peripheral air pressure.

Figure 44:
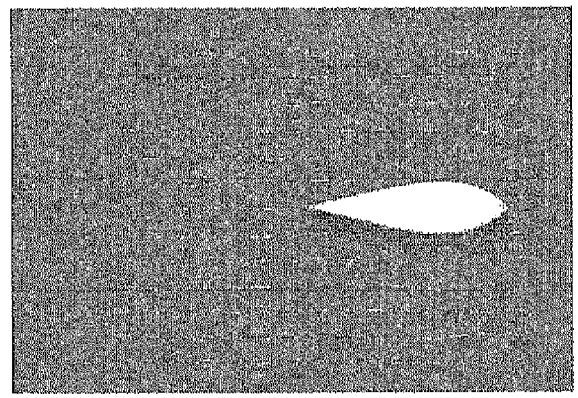
FIG. 44 is a picture illustrating a difference in the flow with the flow speed of the fluid.
Figure 45:
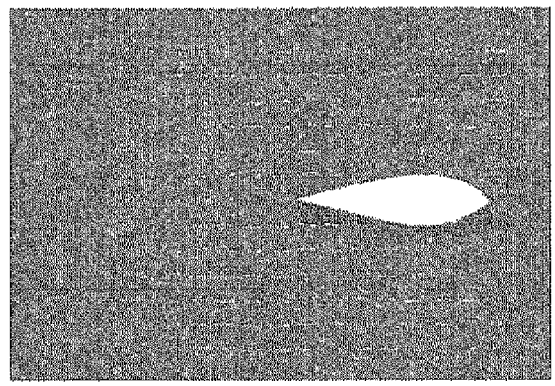
FIG. 45 is a picture illustrating a difference in the flow with the flow speed of the fluid.
Figure 46:
FIG. 46 is a picture illustrating a difference in the flow with the flow speed of the fluid.
Figure 47:
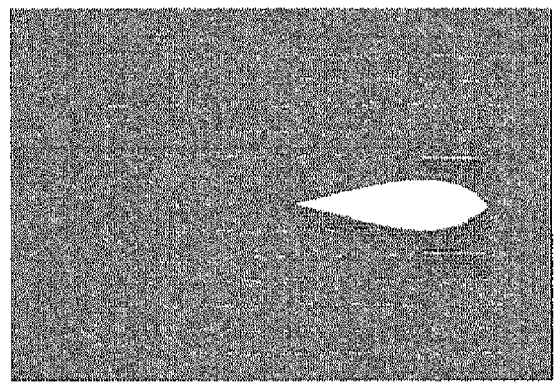
FIG. 47 is a picture illustrating a difference in the flow with the flow speed of the fluid.
Figure 48:
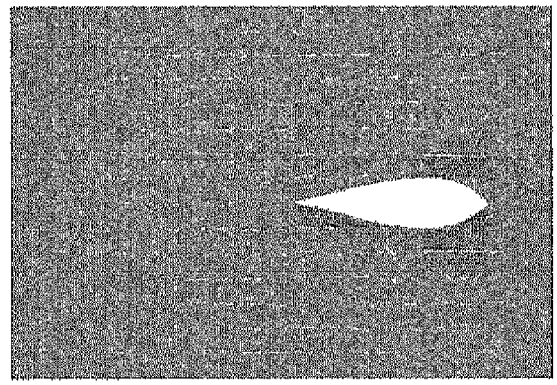
FIG. 48 is a picture illustrating a difference in the flow with the flow speed of the fluid.
Figure 49:
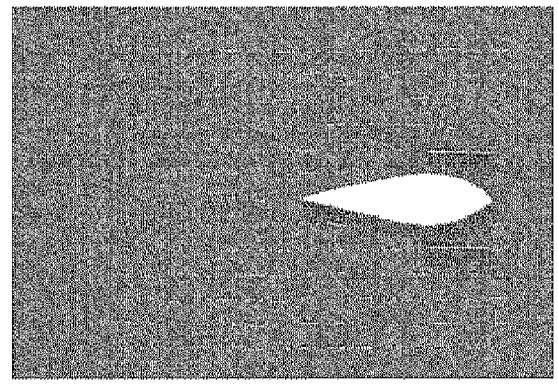
FIG. 49 is a picture illustrating a difference in the flow with the flow speed of the fluid.

FIGS. 44 to 49 are pictures illustrating a difference in the flow of the fluid according to the flow rate thereof, where the auxiliary wing is not provided in FIGS. 44 to 46 and the auxiliary wing is disposed at the contraction flow portion in FIGS. 47 to 49. Further, air is made to flow at the wind speed of 10 m/s in FIGS. 44 and 47, at the wind speed of 20 m/s in FIGS. 45 and 48, and at the wind speed 30 m/s in FIGS. 46 and 49. When the auxiliary wing is disposed in the contraction flow portion, it is found that the peripheral air is further attracted toward the expansion flow portion. Since the compressibility in the contraction flow portion is improved, it is estimated that the detachment does not easily occur. Furthermore, in a change in the wind speed, no particularly large difference in the flow is not found.

As described above, in the fairing device according to the embodiment of the invention, the fluid contacts the auxiliary wing formed at the front part side of the main wing, the fluid is guided between the auxiliary wing and the main wing, and the gas is compressed when passing between the auxiliary wing and the main wing, thereby appropriately forming the fluid compression process region on the surface of the main wing. Accordingly, the internal energy of the fluid may be converted into kinetic energy or mechanical energy by the adiabatic expansion of the expansion flow region, and the flow rate may be increased with kinetic momentum given to the peripheral fluid, thereby increasing the acting force of the fairing device even at the low flow speed. Further, the fairing device may be decreased in size.

Furthermore, the invention is not limited to the above-described embodiment. In the embodiment of the wing structure, a case has been exemplified in which the wing structure of the invention is applied to an air plane. However, the wing structure of the invention may be applied to other flying objects, for example, other wing structures such as a propeller or a turbine.

Further, when the wing structure is reversed in the vertical direction, a downward force may be generated. Thus, the invention may be applied to a wing or the like of a vehicle which desires a downward force. Not only in the vertical direction but also in the direction perpendicular to the front-rear direction of the main wing, the invention may be applied when the force in the direction needs to be generated.

For example, when the wing structure of the invention is applied to a rotating object such as a propeller or a turbine, the efficiency is improved, and hence the number of rotations may be reduced. In fields where the strength is not sufficient at the high-speed rotation, the wing structure of the invention may be used. Since desired capability may be exhibited even when the number of rotations is reduced, the durability may be improved by solving the insufficient strength. Further, for example, even in other components such as a bearing, the durability thereof may be improved by decreasing the number of rotations.

Furthermore, the detachment of the auxiliary wing 3 may not frequently occur in the laminar flow wing as shown in FIG. 1. Accordingly, the downward lift force does not easily occur in the main wing 2.

Further, it is more effective that the main wing 2 has a positive attack angle as shown in FIG. 1. Further, the main wing 2 may be a laminar flow wing, form a compression-adiabatic expansion, and prevent the detachment.

The width of the auxiliary wing 3 in the front-rear direction X may be shorter than the length of the contraction flow region A of the main wing 2 in the front-rear direction X. Since the wing structure 1 includes the auxiliary wing 3 and is interposed by the main wing 2 and the auxiliary wing 3 in the vertical direction, the compression efficiency in the wing structure 1 is higher than that of the existing wing structure without the auxiliary wing 3. Accordingly, the width of the auxiliary wing 3 in the front-rear direction may be shortened.

Further, the auxiliary wing 3 is rotatable about a predetermined shaft, but may be fixed. Further, the auxiliary wing 3 may be formed in the entire length of the main wing 2 in the width direction Y of the air frame or may be formed at a part thereof. Further, plural auxiliary wings may be provided.

In FIG. 11, the slit is formed by dividing the auxiliary wing 33e. However, for example, the slit may be formed by perforating a part of the auxiliary wing 33.

In FIG. 14, the auxiliary wing 33g is disposed so as to be positioned at the rear side of the flow, but may be disposed at the upstream thereof as it moves from the high portion of each constant-height surface to the low portion thereof in the closest portion 54.

In FIG. 16, the length of the auxiliary wing 33h in the longitudinal direction is shorter than that of the main wing 32c. However, in the case of a shape in which the height of the rear part is low as in the auxiliary wing 33h, it is difficult to prevent the external fluid from flowing into the expansion flow portion of the main wing, and hence the length of the auxiliary wing in the longitudinal direction may be longer than that of the main wing.

INDUSTRIAL APPLICABILITY

According to the invention, it is possible to provide a wing structure and a fairing device capable of efficiently compressing a fluid and increasing an acting force.

REFERENCE SIGNS LIST

1: wing structure
2: main wing (wing structure)
2a: front edge
2b: rear edge
3: auxiliary wing (wing structure)
3a: front edge
3b: rear edge
3d: lower surface of auxiliary wing (first curved surface)
21: contraction flow forming portion
22: expansion flow forming portion
22a: wing upper surface of expansion flow forming portion (second curved surface)
31: fairing device
32: main wing (fairing device)
33: auxiliary wing (fairing device)
40: dividing portion (slit)
50: vehicle (moving object)
51: longitudinal center
52: maximal thickness position
53: boundary point
54: closest portion
A: compression flow region
B: expansion flow region
C: compression process region
D: compression-expansion region
X: front-rear direction (fluid flow direction, first direction)
Y: width direction (second direction)
Z: vertical direction

The invention claimed is:

1. A fairing device that is provided in a vehicle, the fairing device comprising:
a main wing that protrudes in a second direction intersecting a first direction as the front-rear direction of the vehicle, the main wing comprising:
a contraction flow forming portion that corresponds to a front part side of the main wing; and
an expansion flow forming portion that is formed so as to be continuous with a rear side of the contraction flow forming portion; and
an auxiliary wing that is disposed so as to be separated from the main wing and that faces the main wing at a front part side of the main wing,
wherein a wing chord length of the auxiliary wing is shorter than a wing chord length of the main wing,
wherein a gap between a front edge of the auxiliary wing and the main wing is wider than a gap between a rear edge of the auxiliary wing and the main wing, and
wherein the rear edge of the auxiliary wing is formed in front of the expansion flow forming portion of the main wing in the first direction,
wherein a curvature of a curved surface of the auxiliary wing directly facing the main wing is larger than a curvature of a curved surface of the main wing directly facing the auxiliary wing.

2. The fairing device according to claim 1, wherein the auxiliary wing is provided at both sides of the main wing.

3. The fairing device according to claim 1, wherein the main wing and the auxiliary wing are provided in a side portion of the vehicle and the main wing has a shape in which the main wing has a wing thickness in the vertical direction of the vehicle.

4. The fairing device according to claim 1, wherein the main wing and the auxiliary wing are provided at the lower side of the vehicle, and the main wing has a shape in which the main wing has a wing thickness in the width direction of the vehicle.

5. The fairing device according to claim 3, wherein the auxiliary wing has a shape in which the auxiliary wing has a wing thickness in the vertical direction of the vehicle wherein a portion in which the wing thickness of the auxiliary wing becomes maximal is set at a front side of a portion in an advancing direction, in which the wing thickness of the main wing becomes maximal.

6. The fairing device according to claim 4, wherein the auxiliary wing has a shape in which the auxiliary wing has a wing thickness in the width direction of the vehicle, and wherein a portion in which the wing thickness of the auxiliary wing becomes maximal is set at the front side of a portion in which the wing thickness of the main wing becomes maximal.

7. The fairing device according to claim 1, wherein the height of the auxiliary wing is larger than a half of the height of the main wing in a portion in which the wing thickness of the main wing becomes maximal.

8. The fairing device according to claim 1, wherein the shapes of the main wing and the auxiliary wing when seen from a third direction perpendicularly intersecting the first direction and the second direction are formed as a stream-line shape.

9. The fairing device according to claim 1, wherein: a ratio of a distance from a center axis of the main wing in the first direction to the auxiliary wing with respect to a minimal distance between the main wing and the auxiliary wing is greater than 1.05 when a flow speed of a fluid flowing between the main wing and the auxiliary wing has a Mach number less than 0.3; and the ratio of the distance from the center axis of the main wing in the first direction to the auxiliary wing with respect to the minimal distance between the main wing and the auxiliary wing is less than or equal to 1.05 when the flow speed of the fluid flowing between the main wing and the auxiliary wing has a Mach number greater than or equal to 0.3.

* * * * *